US009209721B2

(12) United States Patent
Solodovnik et al.

(10) Patent No.: US 9,209,721 B2
(45) Date of Patent: Dec. 8, 2015

(54) SYSTEMS AND METHODS FOR THE CONTROL AND OPERATION OF A PARALLEL MOTOR CONTROLLER ARCHITECTURE

(71) Applicant: The Boeing Company, Chicago, IL (US)

(72) Inventors: Eugene V. Solodovnik, Emerson, WA (US); Kamiar J. Karimi, Everett, WA (US); Shengyi Liu, Sammamish, WA (US)

(73) Assignee: THE BOEING COMPANY, Chicago, IL (US)

( * ) Notice: Subject to any disclaimer, the term of this patent is extended or adjusted under 35 U.S.C. 154(b) by 77 days.

(21) Appl. No.: 14/264,423

(22) Filed: Apr. 29, 2014

(65) Prior Publication Data

US 2015/0311832 A1    Oct. 29, 2015

(51) Int. Cl.
| | |
|---|---|
| H02P 1/54 | (2006.01) |
| H02P 5/00 | (2006.01) |
| H02P 5/46 | (2006.01) |
| H02P 5/68 | (2006.01) |
| B64C 13/24 | (2006.01) |
| B23C 3/16 | (2006.01) |

(52) U.S. Cl.
CPC ... *H02P 5/68* (2013.01); *B23C 3/16* (2013.01); *B64C 13/24* (2013.01); *Y02T 10/646* (2013.01)

(58) Field of Classification Search
CPC .......... H02P 5/68; A63H 19/24; B64C 13/24; Y02T 10/646; B23C 3/16
USPC .............................. 318/51, 99, 719, 801, 807
See application file for complete search history.

(56) References Cited

U.S. PATENT DOCUMENTS

| 8,125,164 B2 * | 2/2012 | White | H02P 5/74 318/34 |
|---|---|---|---|
| 2006/0061213 A1 * | 3/2006 | Michalko | H02J 4/00 307/9.1 |
| 2006/0106521 A1 * | 5/2006 | Nasr | B60K 6/46 701/82 |
| 2007/0259545 A1 | 11/2007 | Berenger | |
| 2008/0100136 A1 | 5/2008 | Langlois et al. | |
| 2008/0111420 A1 | 5/2008 | Anghel et al. | |
| 2008/0111421 A1 | 5/2008 | Anghel et al. | |

* cited by examiner

FOREIGN PATENT DOCUMENTS

| EP | 1921741 A2 | 5/2008 |
|---|---|---|
| JP | 8076815 | 3/1996 |

OTHER PUBLICATIONS

International Search Report and Written Opinion dated Jun. 9, 2011 in PCT/US2009/047563.

*Primary Examiner* — Shawki S Ismail
*Assistant Examiner* — Bradley Brown
(74) *Attorney, Agent, or Firm* — Robert Parker

(57) ABSTRACT

A method for real time power control over a plurality of motor controllers by at least one processor on a computer system may include determining a power load demand from a first set of motors, selecting a combination of motor controllers to match the power load demand, assigning a first set of system-wide priorities, configuring a power switching network to connect the first set of motors to the motor controllers, receiving from a control unit a power request for a motor, determining a priority designation for that motor, assigning a second set of system-wide priorities, determining a second power load demand from a second set of motors, wherein the second plurality of active motors comprises the first plurality of active motors and the first motor, selecting a second combination of motor controllers necessary to match the second power load demand, and configuring the power switching network in accordance with the second set of system-wide priorities.

20 Claims, 20 Drawing Sheets

SYSTEMS AND METHODS FOR THE CONTROL AND OPERATION OF A PARALLEL MOTOR CONTROLLER ARCHITECTURE

TECHNICAL FIELD

The present invention relates to electrical power conversion systems, motor control and distribution systems.

BACKGROUND

Motors are used in a large variety of applications. In many applications, a motor is connected to a motor controller that performs a particular function for managing the operations of the motor. For example, motors in aircraft are used to drive control surfaces, environmental systems, and many other systems. These motors typically each receive electrical power from a dedicated motor controller connected in-line between the motor and a power source. The motor controller may include any combination of rectifiers, inverters, and filters that condition the electrical signal received from the power source for use by the motor.

In aircraft and other vehicle platforms, there is typically one dedicated motor controller installed within the vehicle for every motor. Each motor controller is sized according to the peak power load demand of the motor that is serviced by the motor controller. For example, a 100 kilowatt (kW) motor would require a 100 kW motor controller, which is a motor controller that is capable of conditioning and providing 100 kW to the motor.

Motor controllers can be relatively heavy equipment. Various components of the motor controllers, such as input and output filters, significantly increase the overall weight of each controller. Because the weight of the motor controllers is substantially proportional to the power rating of the controller, the higher the power rating of the motor controller, the heavier the motor controller will be.

It is with respect to these considerations and others that the disclosure made herein is presented.

SUMMARY

In one embodiment, a method for real time power control over a plurality of motor controllers by at least one processor on a computer system may include determining a first power load demand from a first plurality of active motors, wherein the first plurality of active motors is a subset of a plurality of motors; selecting a first combination of motor controllers of the plurality of motor controllers necessary to provide sufficient power to meet the first power load demand based at least in part on a maximum power output of the plurality of motor controllers; assigning a first set of system-wide priorities based at least in part on the maximum power output and the first power load demand; configuring a power switching network such that the first plurality of active motors are electrically connected to the first number of motor controllers in accordance with the first set of system-wide priorities; receiving from a first control unit a power request for a first motor, wherein the power request is associated with a first priority level; determining a first priority designation for the first priority level in relation to the first set of system-wide priorities; assigning a second set of system-wide priorities based at least in part on the first priority designation and the first set of system-wide priorities; determining a second power load demand from a second plurality of active motors, wherein the second plurality of active motors comprises the first plurality of active motors and the first motor; selecting a second combination of motor controllers of the plurality of motor controllers necessary to provide sufficient power to meet the second power load demand; and configuring the power switching network such that the second plurality of active motors are electrically connected to the second combination of motor controllers in accordance with the second set of system-wide priorities. In another embodiment, a motor control system may include a plurality of motors; a plurality of motor controllers configured for parallel electrical connection; a power switching network electrically connecting the plurality of motors to the plurality of motor controllers; and a parallel modular converter for dynamically controlling the power switching network, comprising a computer with at least one processor and a non-transitory storage medium having computer executable instructions stored thereon which, when executed on the computer, cause the computer to determine a first power load demand from a first plurality of active motors, wherein the first plurality of active motors is a subset of the plurality of motors; select a first combination of motor controllers of the plurality of motor controllers necessary to provide sufficient power to meet the first power load demand based at least in part on a maximum power output of the plurality of motor controllers; assign a first set of system-wide priorities based at least in part on the maximum power output and the first power load demand; configure the power switching network such that the first plurality of active motors are electrically connected to the first number of motor controllers in accordance with the first set of system-wide priorities; receive from a first control unit a power request for a first motor, wherein the power request is associated with a first priority level; determine a first priority designation for the first priority level in relation to the first set of system-wide priorities; assign a second set of system-wide priorities based at least in part on the first priority designation and the first set of system-wide priorities; determine a second power load demand from a second plurality of active motors, wherein the second plurality of active motors comprises the first plurality of active motors and the first motor; select a second combination of motor controllers of the plurality of motor controllers necessary to provide sufficient power to meet the second power load demand; and configure the power switching network such that the second plurality of active motors are electrically connected to the second combination of motor controllers in accordance with the second set of system-wide priorities.

In yet another embodiment, an aircraft having a motor control system, may include a plurality of motors; a plurality of motor controllers configured for parallel electrical connection; power switching network electrically connecting the plurality of motors to the plurality of motor controllers; and a parallel modular converter for dynamically controlling the power switching network, comprising a computer with at least one processor and a non-transitory storage medium having computer executable instructions stored thereon which, when executed on the computer, cause the computer to receive a communication including a requested mode and a requested mode power amount; calculate a maximum power capacity based at least in part on a total number of motor controllers and a power amount associated with each motor controller; calculate a current power usage based at least in part on what modes are currently running and what power is getting consumed as a result of those running modes; determine a current power capacity that is currently available for use by taking the difference between the maximum power capacity and the current power usage; run the requested mode and reduce the current power capacity to account for the running of the requested mode, only if the current power capacity is not less than the requested mode power amount, but if the current power capacity is less than the requested mode power amount, then determine a requested mode priority designation relative to all other running modes; run the requested mode at only the current power capacity and then reduce the current power capacity to account for the running of the requested mode, only if the priority of the requested mode is less than or equal to the priority of all other running modes, but if the priority of the requested mode is not less than or equal to the priority of all other currently running modes, then determine if there exist any lower priority modes having a priority designation only lower than the requested mode priority designation, and if there exist any lower priority modes, then determine if the only lower priority modes that exist are first least priority modes having a priority designation only a single level lower than the requested mode priority designation, and if there exist any first least priority modes, then determine a first least priority modes total power that is currently used by those first least priority modes, then partially reduce the first least priority modes total power, direct that partially reduced power to the requested mode, and set the current power capacity to zero, only if it is possible to make a partial reduction of the first least priority modes total power, if it is not possible to make a partial reduction of the first least priority modes total power, then completely reduce the first least priority modes total power, direct that completely reduced power to the requested mode, and set the current power capacity to zero; determine if there exist second least priority modes having a priority designation between the first least priority modes designation level and the requested mode priority designation level, and if there exist any second least priority modes, then; partially reduce the first least priority modes total power, direct that partially reduced power to the requested mode, only if it is possible to make a partial reduction of the first least priority modes total power, if it is not possible to make a partial reduction of the first least priority modes total power, then; completely reduce the first least priority modes total power; determine a second least priority modes total power that is currently used by those second least priority modes; partially reduce the second least priority modes total power, direct that partially reduced power to the requested mode, only if it is possible to make a partial reduction of the second least priority modes total power, if it is not possible to make a partial reduction of the second least priority modes total power, then; completely reduce the first least priority modes total power and the second least priority modes total power, direct that combined completely reduced power to the requested mode, and set the current power capacity to zero.

The features, functions, and advantages that have been discussed can be achieved independently in various embodiments of the present invention or may be combined in yet other embodiments, further details of which can be seen with reference to the following description, the accompanying drawings and the appended claims.

DETAILED DESCRIPTION

Motors typically include a motor controller for configuring and providing power to the motor. In a system that includes a group of motors, there are typically an identical number of motors and motor controllers. The motor controllers are most often rated to provide a peak power load that is equivalent to or greater than the peak load of the corresponding motor.

Utilizing the concepts and technologies described herein, a system of motors includes a number of motor controllers connected in parallel to a power switching network. By utilizing this architecture as described below, the number of motor controllers and/or the power rating, or power output capability, of each motor controller may be reduced in such a manner as to reduce the overall weight of the motor system. Throughout this disclosure, embodiments are described with respect to motors and motor controllers utilized within an aircraft. An aircraft environment provides a useful example for embodiments described herein since reducing weight of an aircraft is a universal objective. However, it should be understood that the concepts presented herein are equally applicable to motor systems within any platform, including ships, vehicles, or any other platform in which size and/or weight reduction is a consideration.

Figure 1:
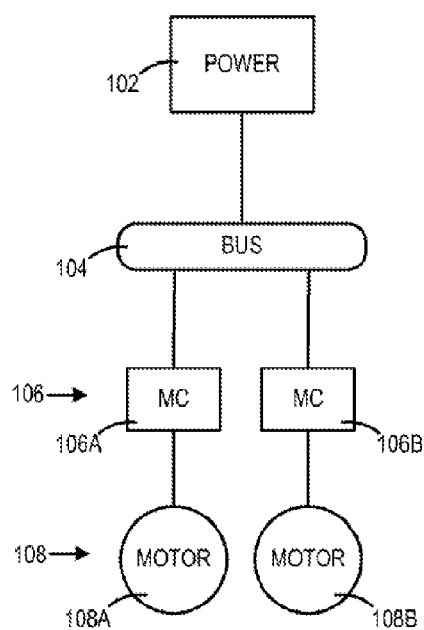
FIG. 1 is a block diagram showing a conventional motor controller architecture.

In the following detailed description, references are made to the accompanying drawings that form a part hereof, and which are shown by way of illustration, specific embodiments, or examples. Referring now to the drawings, in which like numerals represent like elements through the several figures, a parallel motor controller architecture will be described. FIG. 1 shows a conventional architecture 100 of motor controllers for providing power to motors 108. According to the conventional architecture 100, a power source 102 provides power to a bus 104, which directs power to any number of conventional motor controllers 106.

It should be appreciated that for clarity, only two conventional motor controllers 106A and 106B and corresponding motors 108A and 108B are shown. Each conventional motor controller 106 conditions the received power signal for use by a single connected motor 108. In the example shown, the conventional motor controller 106A provides power to the motor 108A, while the conventional motor controller 106B provides power to the motor 108B.

For illustrative purposes, the conventional architecture 100 may be implemented within an aircraft. According to this implementation, the power source 102 provides an alternating current (AC) or a direct current (DC) signal to the conventional motor controllers 106. Example conventional motor controllers 106A and 106B include, but are not limited to, a cabin air compressor motor controller, a hydraulic electric motor pump motor controller, a generator engine starting motor controller, a nitrogen generation system compressor motor controller, a fan motor controller, and a flight controls actuator motor controller. It should be appreciated that any type of motor controllers 106 and motors 108 may be utilized within any type of vehicle or other platform without departing from the scope of this disclosure.

Looking now at FIG. 2, a parallel motor controller architecture 200 will be described according to various embodiments. Similar to the example conventional architecture 100 shown in FIG. 1, the parallel motor controller architecture 200 includes the power source 102, the bus 104, and the motors 108. However, in the parallel motor controller architecture 200, there are multiple parallel motor controllers 204 that are connected in parallel to a power switching network 202. The power switching network 202 provides power from the parallel motor controllers 204 to the motors 108. The power switching network 202 includes an electrical circuit that electrically connects the parallel motor controllers 204 to the motors 108 via a series of electrical switches that enable any number of parallel motor controllers 204 to be connected to any given motor 108. The power switching network 202 may include or be connected to a computing device that controls the electronic switches to couple parallel motor controllers 204 as necessary to provide adequate power to the motors 108 according to the present power load requirements of the motors 108 as they change at any given instant in time. The operations of the power switching network 202 will be described in greater detail below.

Figure 2:
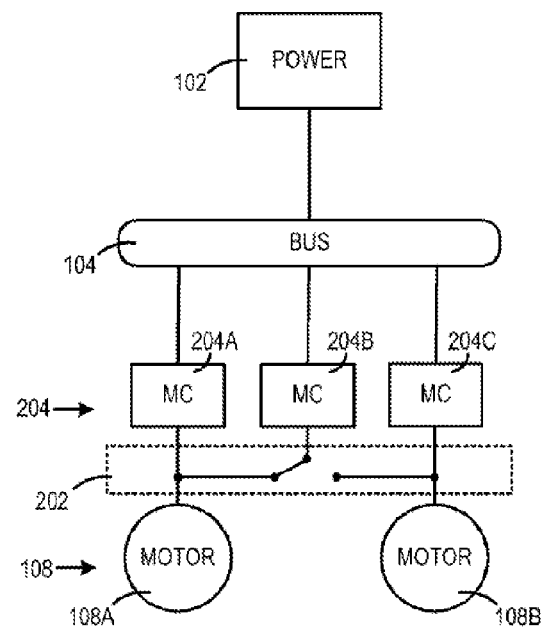
FIG. 2 is a block diagram showing a parallel motor controller architecture according to various embodiments presented herein.

In the example shown in FIG. 2, the three parallel motor controllers 204 each have a power output capability that is lower than that of the conventional motor controllers 106 shown in FIG. 1. For example, the parallel motor controllers 204A, 204B, and 204C may each be capable of providing 50 kW of power such that the combined power output capability of the motor controllers 204 is 150 kW. In contrast, the conventional architecture 100 of FIG. 1 utilizes two conventional motor controllers 106A and 106B, each having a power output capability of 100 kW for a combined power output capability of 200 kW. Because the weight of the motor controllers is typically proportional to the power output capability, the parallel motor controller architecture 200 shown in FIG. 2 may weigh less than the conventional architecture 100 shown in FIG. 1, even though three parallel motor controllers 204 are utilized in the parallel motor controller architecture 200 as opposed to two conventional parallel motor controllers 106 utilized in the conventional architecture 100.

The concepts and technologies described herein take advantage of the operational characteristics of the motors 108 in vehicle and other implementations in which the peak power loads, or the maximum power requirements, of the motors 108 do not occur simultaneously. In these implementations having complementary power loads on the motors, multiple smaller parallel motor controllers 204 can be utilized instead of the dedicated, larger conventional motor controllers 106 and be dynamically reconfigured as described herein to shift power delivery between motors 108 as the power demands of the motors 108 dictate.

It should be appreciated that the example shown in FIG. 2 is simplified for clarity. Although only three parallel motor controllers, 204A, 204B, and 204C, are shown as being connected to two motors, 108A and 108B, any number of parallel motor controllers 204 may be utilized to provide power to any number of motors 108 according to various embodiments. Similarly, the power switching network 202 is shown as including a single, simple electronic switch for clarity purposes. However, any number and type of switching mechanisms may be utilized within the power switching network 202 to combine the power outputs of the parallel motor controllers 204 for delivery to the motors 108.

Figure 3:
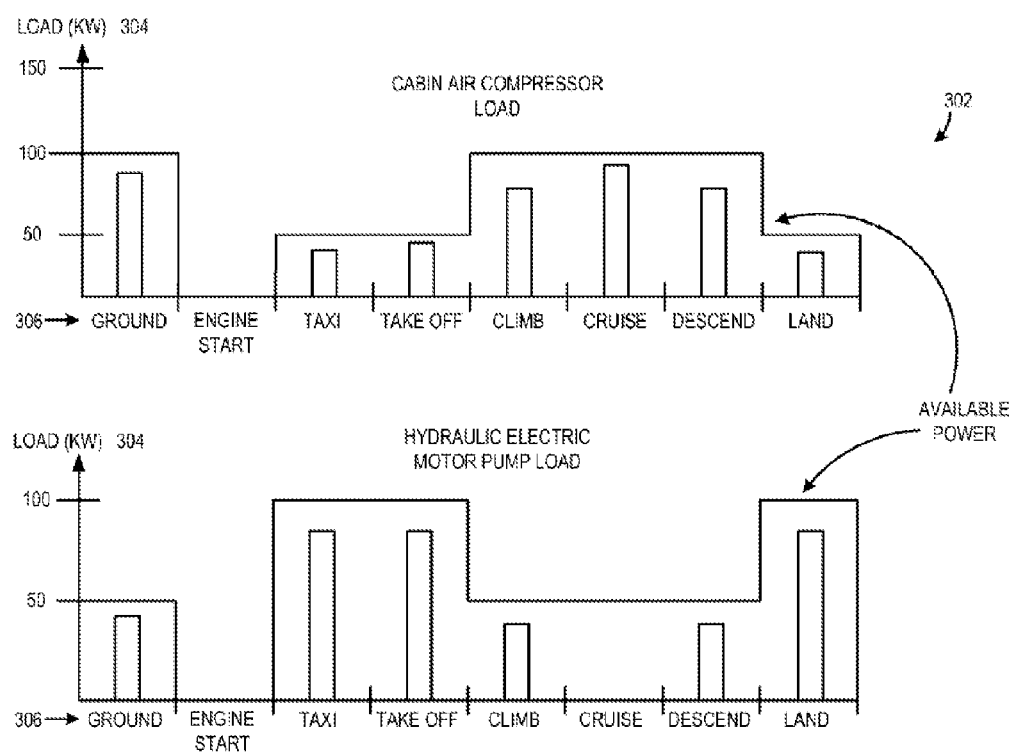
FIG. 3 is a power load chart showing an graph of a power load requirement of a cabin air compressor versus a hydraulic motor pump during different phases of aircraft flight according to various embodiments presented herein.

Turning now to FIG. 3, an illustrative power load chart 302 will be described. The power load chart 302 shows how the embodiments described herein take advantage of the complimentary power load requirements 304 of two different motors on an aircraft during different phases of flight to utilize parallel motor controllers 204 in providing power to the motors 108. In this example, the top graph shows the power load requirement 304 of a cabin air compressor during eight flight phases 306, including ground operations, engine start, taxi, take off, climb, cruise, descent, and landing. The vertical axis represents the present power load requirement 304 of the cabin air compressor.

The bottom graph shows the power load requirement 304 of a hydraulic electric motor pump during the same eight flight phases 306. Following the two graphs from left to right through the various flight phases 306, it can be seen that the available power, which is the power output capability of all of the parallel motor controllers 204 together for providing power to each of the two motors 108, remains at 150 kW. This available power could be provided utilizing the parallel motor controller architecture 200 shown in FIG. 2 in which each of the three parallel motor controllers 204 are rated at 50 kW. The combined 150 kW of the three parallel motor controllers 204 is dynamically redistributed between the cabin air compressor and the hydraulic electric motor pump as the current operational demands of the two motors 108 changes during the various flight phases 306.

As an example, it can be seen that during ground operations, 100 kW of power is provided to the cabin air compressor and 50 kW of power is provided to the hydraulic electric motor pump. To do so, two parallel motor controllers 204 are connected to the cabin air compressor and one motor controller 204 is connected to the hydraulic electric motor pump. During engine start, the motor controllers 204 may be connected to a generator so that the entire 150 kW of available power is directed to the generator for engine start. This architecture will be further described below with respect to FIG. 4B.

During taxi and takeoff the operational demands of the motors 108 leads to a reconfiguration of the power switching network 202 such that the power output to the cabin air compressor is reduced to 50 kW, while the power output from two of the parallel motor controllers 204 is redirected to the hydraulic electric motor pump. During climb, cruise, and descent, 100 kW of power is directed to the cabin air compressor and 50 kW of power is directed to the hydraulic electric motor pump. Finally, during landing when there is a higher demand on the hydraulic electric motor pump due to the lowering of landing gear and certain flight control surfaces, power is shifted to provide 100 kW of power to the hydraulic electric motor pump and 50 kW of power to the cabin air compressor.

It should be understood that the values of the power load requirements 304 of the cabin air compressor and hydraulic electric motor pump are given for illustrative purposes to show the complimentary nature of the power demands of the two motors 108 and the dynamic reconfiguration of the power switching network 202 to redistribute power as required by the power load requirements of the motors 108. It should further be appreciated that while only example data for the cabin air compressor and hydraulic electric motor pump are shown, any number and type of motors 108 may be utilized and the available power from all of the parallel motor controllers 204 is dynamically distributed between all of the motors 108.

Figure 4A:
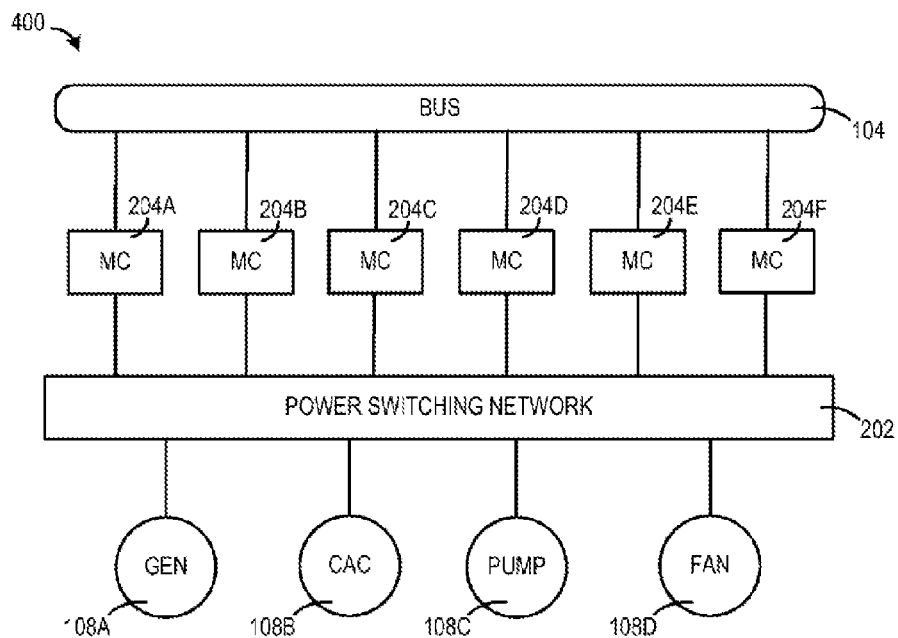
FIGS. 4A-4E are block diagrams showing examples of motor controller switching architectures according to various embodiments presented herein.

FIG. 4A shows an example power distribution system 400 that will be used throughout FIGS. 4B-4E to illustrate the dynamic reconfiguring of the electrical connections within the power switching network 202 to redirect power from one or more parallel motor controllers 204 to one or more motors 108 as the current operational demands of the motors changes during different phases of flight. Throughout these examples shown in FIGS. 4A-4E, six parallel motor controllers 204A-204F provide power to four motors 108, including a generator 108A, a cabin air compressor 108B, a pump 108C, and a fan 108D.

Figure 4B:
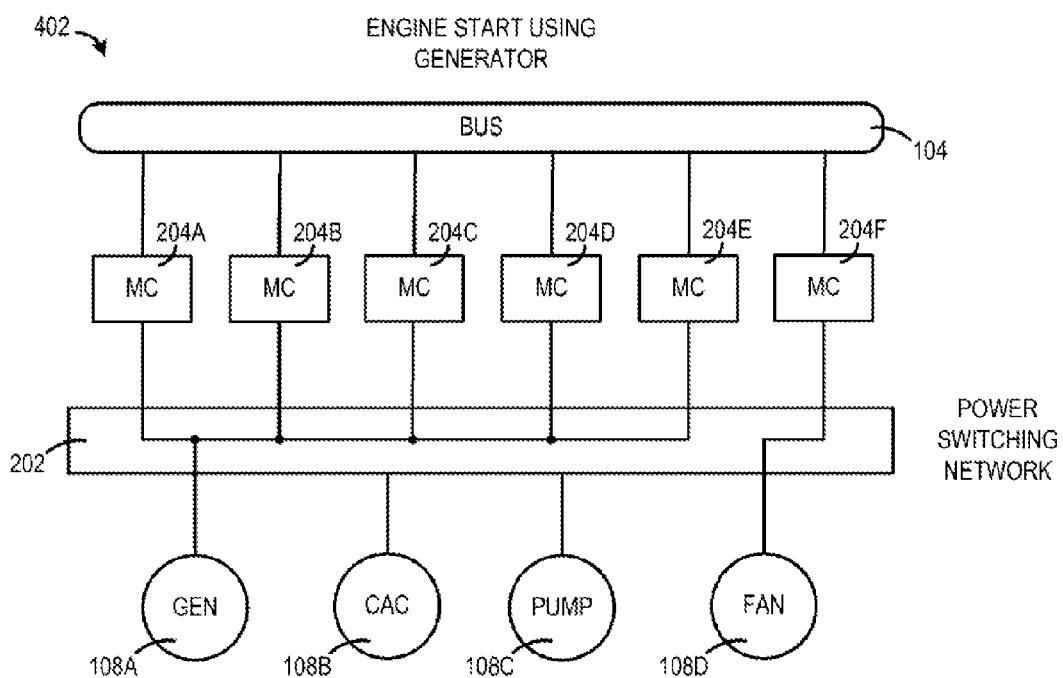

FIG. 4B shows an engine start power distribution system 402 that represents the electrical connections within the power switching network 202 during an engine start of an aircraft using the generator 108A. In this scenario, the generator 108A demands a very large power load. As a result, all of the parallel motor controllers 204A-204E are electrically connected to the generator 108A, leaving the motor controller 204F to provide some power to the fan 108D for cooling aircraft equipment.

Figure 4C:
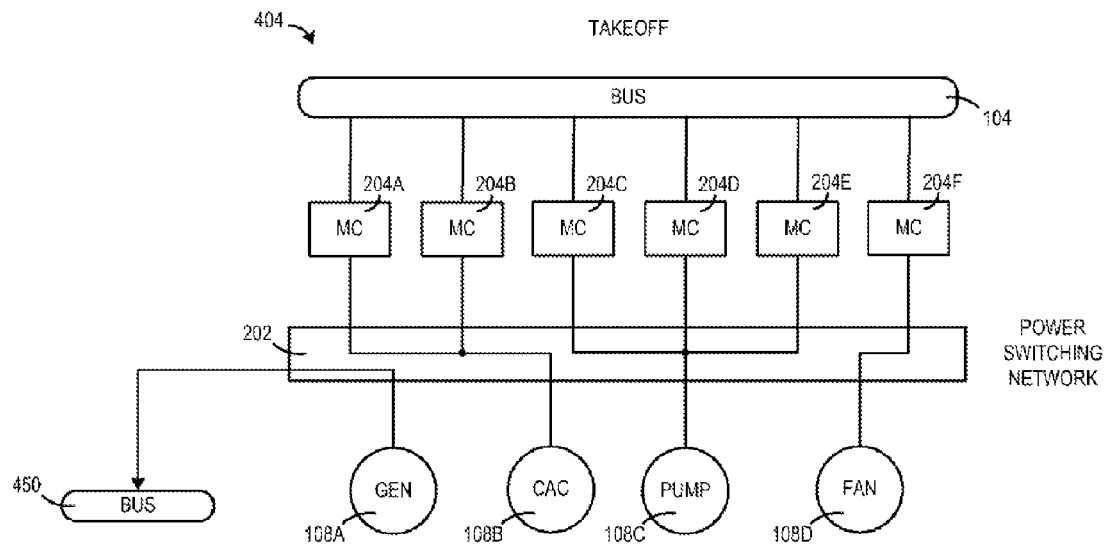

FIG. 4C shows a takeoff power distribution system 404 that represents the electrical connections within the power switching network 202 during aircraft takeoff. Because the generator 108A no longer requires power from the parallel motor controllers 204 after engine start, the generator 108A is shown to be providing power to a bus 450. The parallel motor controllers 204 that supplied power to the generator 108A during engine start have been reconfigured to supply power to the cabin air compressor 108B and the pump 108C. During takeoff, the power load requirement 304 of the pump 108C is larger than that of the cabin air compressor 108B. As a result, in this example, two parallel motor controllers 204A and 204B are connected to the cabin air compressor 108B and three parallel motor controllers 204C-204E are connected to the pump 108C.

Figure 4D:
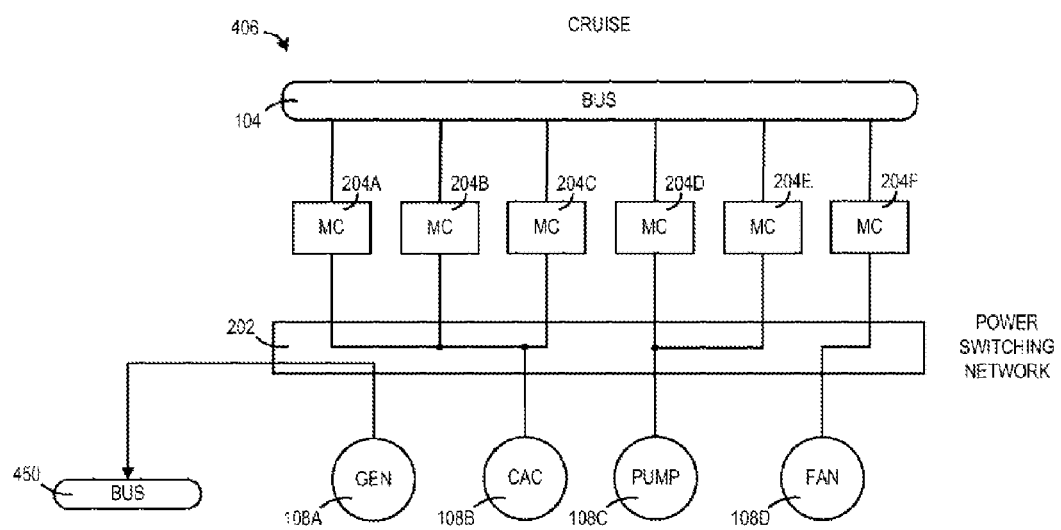

FIG. 4D depicts a cruise power distribution system 406 in which the power switching network 202 is reconfigured during cruise conditions. Because the power load requirements 304 of the cabin air compressor 108B and the pump 108C are complimentary (as shown in FIG. 3), the connection of the parallel motor controller 204C is switched from the pump 108C to the cabin air compressor 108B during cruise to satisfy the higher power load demands of the cabin air compressor 108B.

Figure 4E:
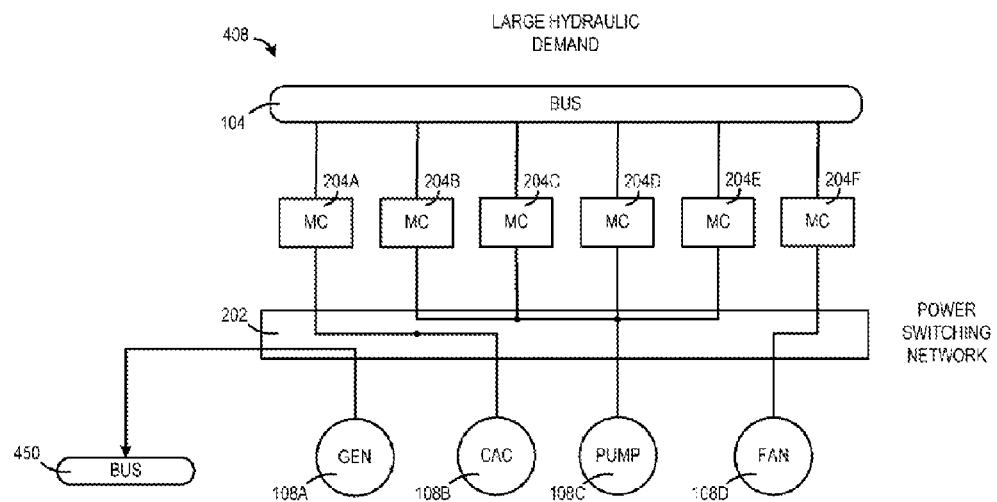

FIG. 4E shows a hydraulic demand power distribution system 408 in which the power switching network 202 is reconfigured during temporary hydraulic conditions such as raising or lowering the landing gear and reversing the thrust of the engines. As can be seen, four of the six parallel motor controllers 204 are electrically connected to the pump 108C. As is the case in any of the scenarios presented, as soon as the high power load requirement 304 of the pump 108C subsides, the power switching network 202 is again reconfigured according to the present power load requirements 304 of all of the motors 108.

Figure 5A:
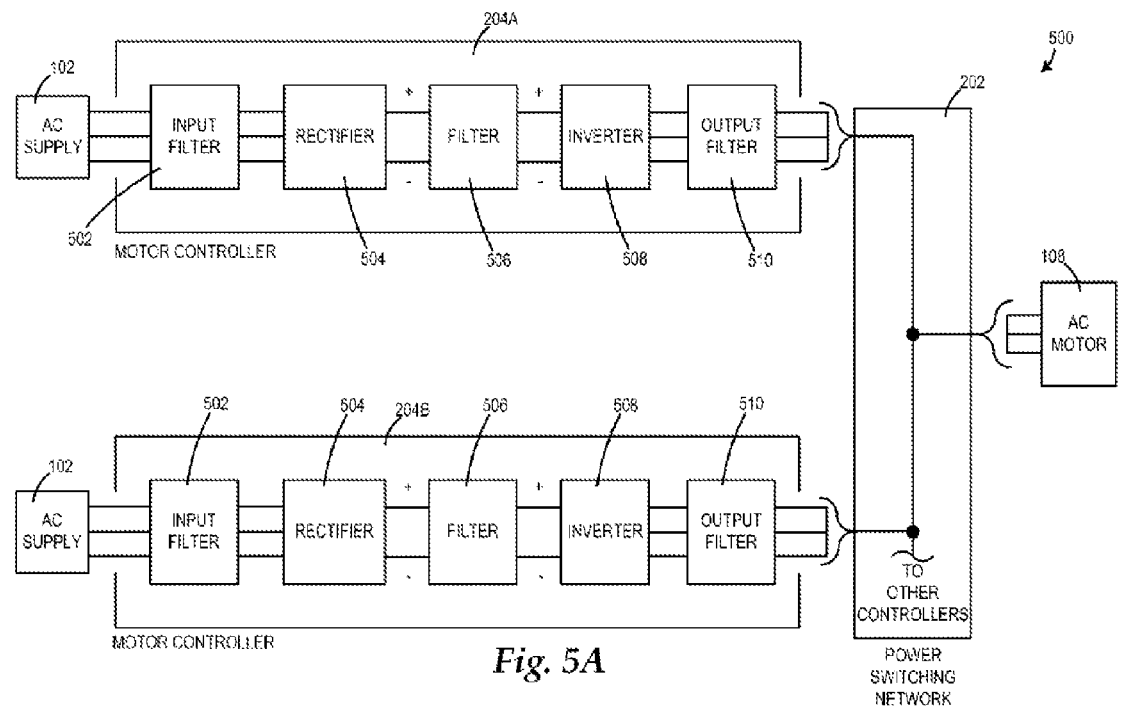
FIGS. 5A-5C are block diagrams showing implementations utilizing alternative placements of output filter within a motor controller system according to various embodiments presented herein.
Figure 5B:
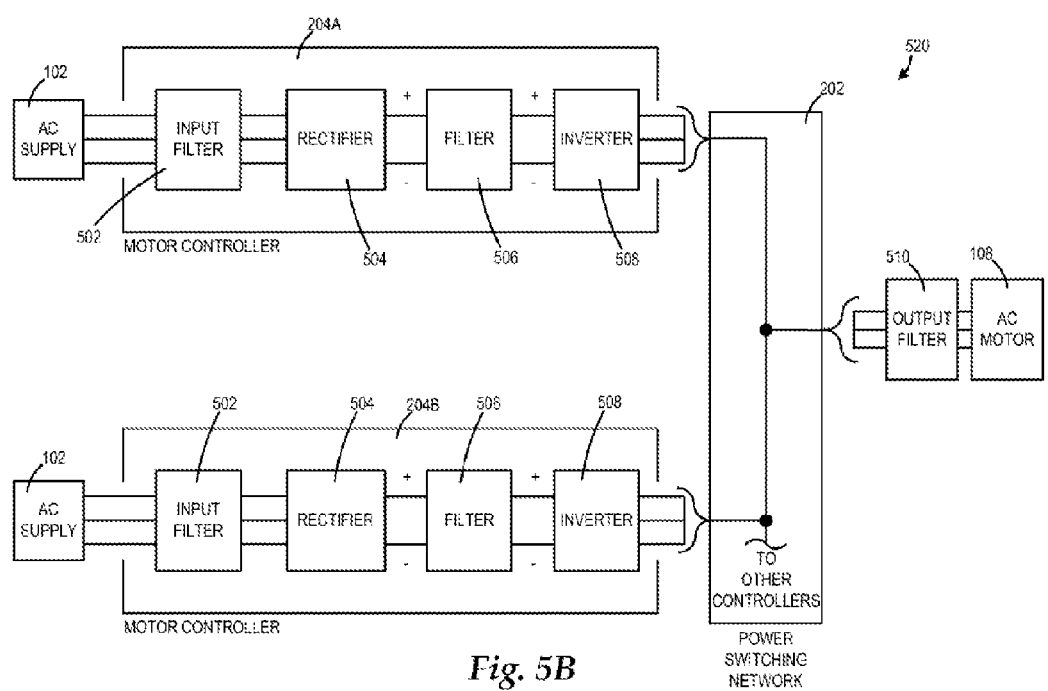
Figure 5C:
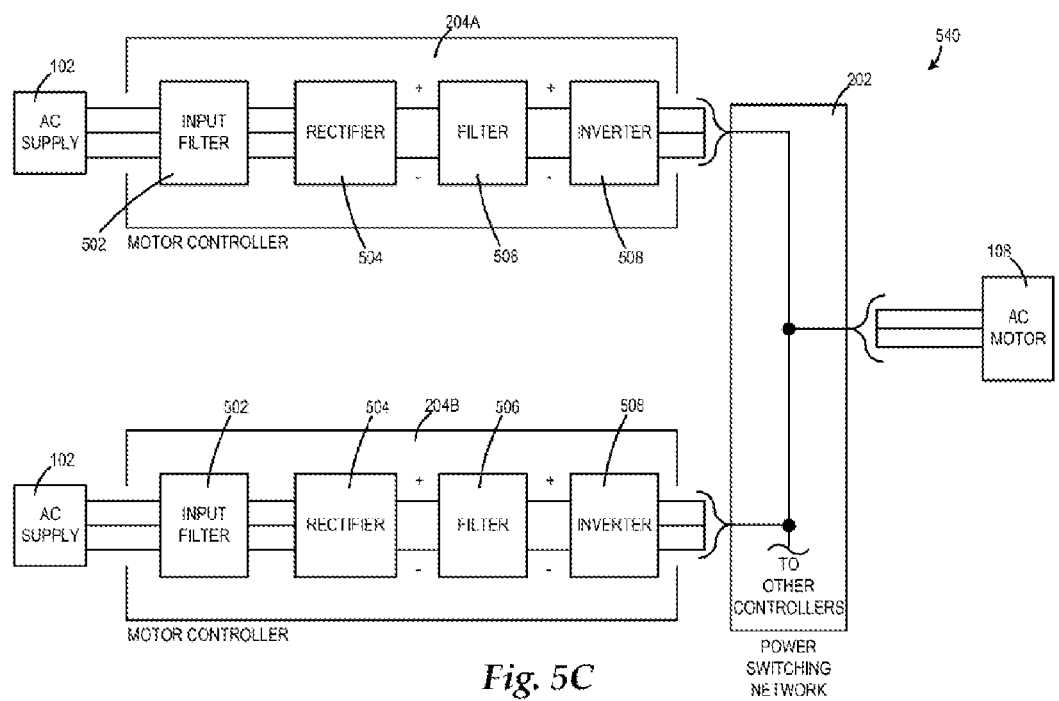

FIGS. 5A-5C show alternative configurations 500, 520, and 540, respectively, of a motor controller system to illustrate various placements of an output filter 510 according to various embodiments. Conventional motor controllers 106 utilize filters to aid in conditioning electronic signals for use by a motor 108. FIG. 5A shows one embodiment in which parallel motor controllers 204A and 204B are connected to the power switching network 202 for providing power to the motor 108. In this example, the power source 102 provides an AC signal to the parallel motor controllers 204.

Each motor controller 204 includes an input filter 502, output filter 510, and intermediate filter 506 that is positioned between a rectifier 504 and an inverter 508. It should be appreciated that the components of the parallel motor controllers 204 are not limited to those shown in FIGS. 5A-5C and that the components of any given parallel motor controller 204 may vary from those shown. For example, when the power source 102 provides DC input to the parallel motor controllers 204, the parallel motor controllers 204 may include an input filter 502, an inverter 508, and an output filter 510, without requiring a rectifier 504 or any additional filters.

FIG. 5B shows an alternative motor controller configuration 520 in which the parallel motor controllers 204 share a single output filter 510. In this embodiment, an output filter 510 may be connected to the motor 108 so that power received from the power switching network 202 is input into the output filter 510 prior to receipt by the motor 108. Doing so allows for the removal of the output filters 510 from the parallel motor controllers 204. Sharing an output filter 510 rather than including an output filter 510 within every parallel motor controller 204 saves overall system weight since filters can be relatively heavy components.

To further save weight, the embodiment shown in FIG. 5C shows an alternative motor controller configuration 540 in which one or more parallel motor controllers 204 do not utilize the output filter 510. Typically, the output filters 510 are used due to the length of the power feeders from the parallel motor controllers 204 in an equipment bay of an aircraft or other vehicle to the motors 108. The electrical signal from the parallel motor controllers 204 may be configured as pulse-width modulated or switched (square) waveforms that include significant harmonic content that gets amplified by the impedance of the power feeders by the time that the signals are received by the motors 108. The output filters 510 within the parallel motor controllers 204 smooth out the waveforms and prevent damage to the motors 108 caused by the amplified harmonics of the unfiltered square waveforms. However, in embodiments in which the parallel motor controllers 204 are located close to the motors 108, or if radiated emissions from the power feeders are not a consideration, then the alternative motor controller configuration 540 shown in FIG. 5C that does not include any output filters 510 may be used to further minimize the weight of the motor controller system.

It should be appreciated that the logical operations described in FIGS. 6 through 17 are implemented (1) as a sequence of computer implemented acts or program modules running on a computing system and/or (2) as interconnected machine logic circuits or circuit modules within the computing system. The computing system may be a part of or connected to the power switching network 202 and will be described below with respect to FIG. 18. The implementation of the logical operations described herein is a matter of choice dependent on the performance and other requirements of the computing system. Accordingly, the logical operations described herein are referred to variously as states operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 6:
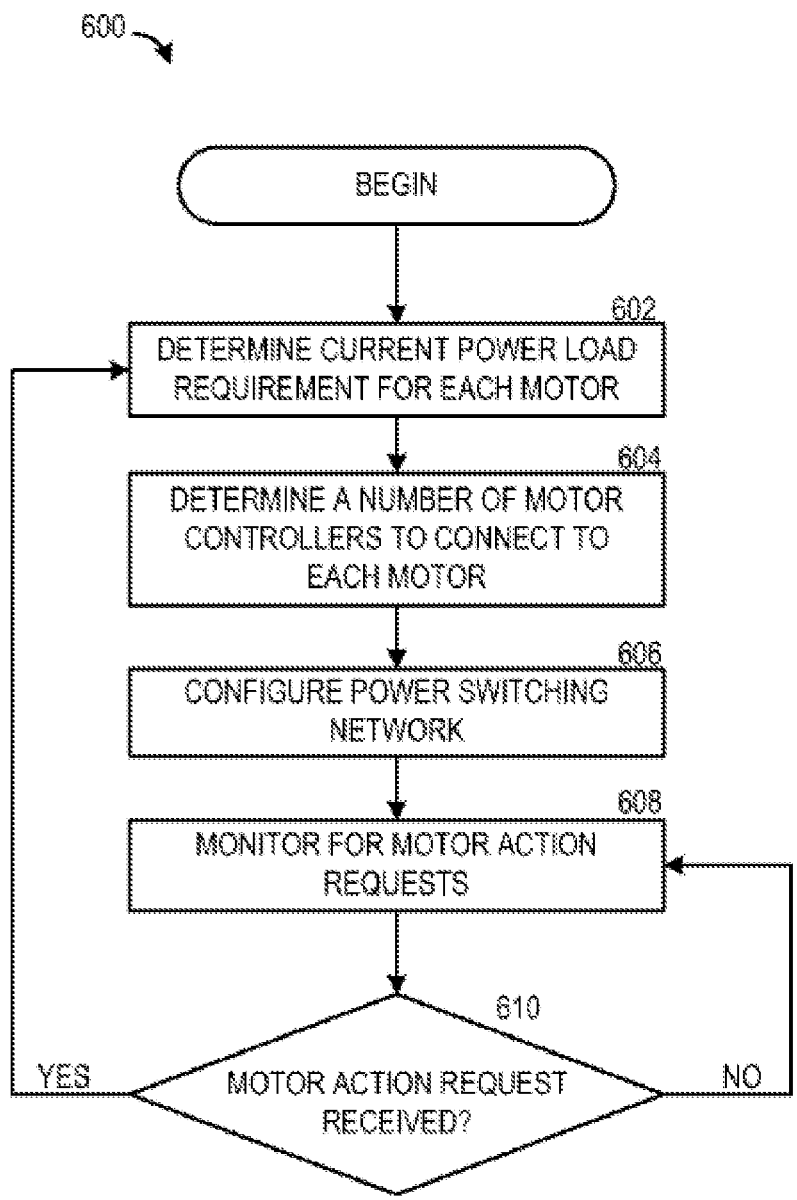
FIG. 6 is a flow diagram illustrating a prior art method for controlling a group of motors.

Turning now to FIG. 6, an illustrative routine 600 from the prior art for controlling a group of motors 108 will now be described. The routine 600 begins at operation 602, where the present power load requirements 304 of each motor 108 are determined. This operation and others may be performed by a motor controller reconfiguration application executing on the computer system, either as part of the power switching network 202 or in communication with the power switching network 202. As described above, the present power load requirement 304 of a motor 108 represents the operational power demand at that instance in time. As illustrated in FIG. 3, the present power load requirement 304 of a motor 108 within an aircraft or other vehicle or platform may change according to an operational phase, such as various flight phases 306. The present power load requirements 304 of different motors 108 may be complimentary such that an increase in a power requirement for one motor 108 coincides with a corresponding decrease in a power requirement for another motor 108, which allows for the dynamic reconfiguration of the electrical connections within the power switching network 202 as described herein.

From operation 602, the routine 600 continues to operation 604, where the number of parallel motor controllers 204 to be connected to each motor 108 is determined. As described above, the number of parallel motor controllers 204 to be connected to any given motor 108 may include the least number of parallel motor controllers 204 that are capable of supplying the present power load requirement 304 of the particular motor 108. For example, if a motor 108 is utilizing 100 kW of power, then two parallel motor controllers 204 capable of each providing 50 kW of power are connected to the motor 108. At operation 606, the power switching network 202 is configured according to connect the parallel motor controllers 204 to the motors 108 according to the present power load requirements of the motors as determined at operation 604. It should be appreciated that the power switching network 202 is configured by activation of any number of electronic switches within a circuit connecting the parallel motor controllers 204 to each of the motors 108.

From operation 606, the routine 600 continues to operation 608, where the motor controller system is monitored for motor action requests. According to one embodiment, a motor action request may be any activation or motion of a switch, lever, control device, or other apparatus used to control a system that utilizes one or more motors 108. For example, in an aircraft environment, a motor action request may include, but is not limited to, the lowering or raising of landing gear, the activation or motion of a control for moving a flight control surface, and the activation of a pump. It should be appreciated that the motor action request may be the result of an action taken by a person or may be the result of a computer-controlled action. It should also be understood that the monitoring operation may include active monitoring or polling of any number of systems, or may be passive monitoring such as the receipt of a request.

At operation 610, if a motor action request is not received, then the routine 600 returns to operation 608 and the monitoring continues. However, if at operation 610, it is determined that a motor action request has been made or received, then the routine 600 returns to operation 602, where the present power load requirements 304 of the motors 108 is reassessed and the routine 600 continues as described above. In this manner, the power switching network 202 may be dynamically reconfigured so as to respond to changes in the power load requirements 304 of the motors 108 by redirecting power from the parallel motor controllers 204 to the applicable motors 108.

Figure 7:
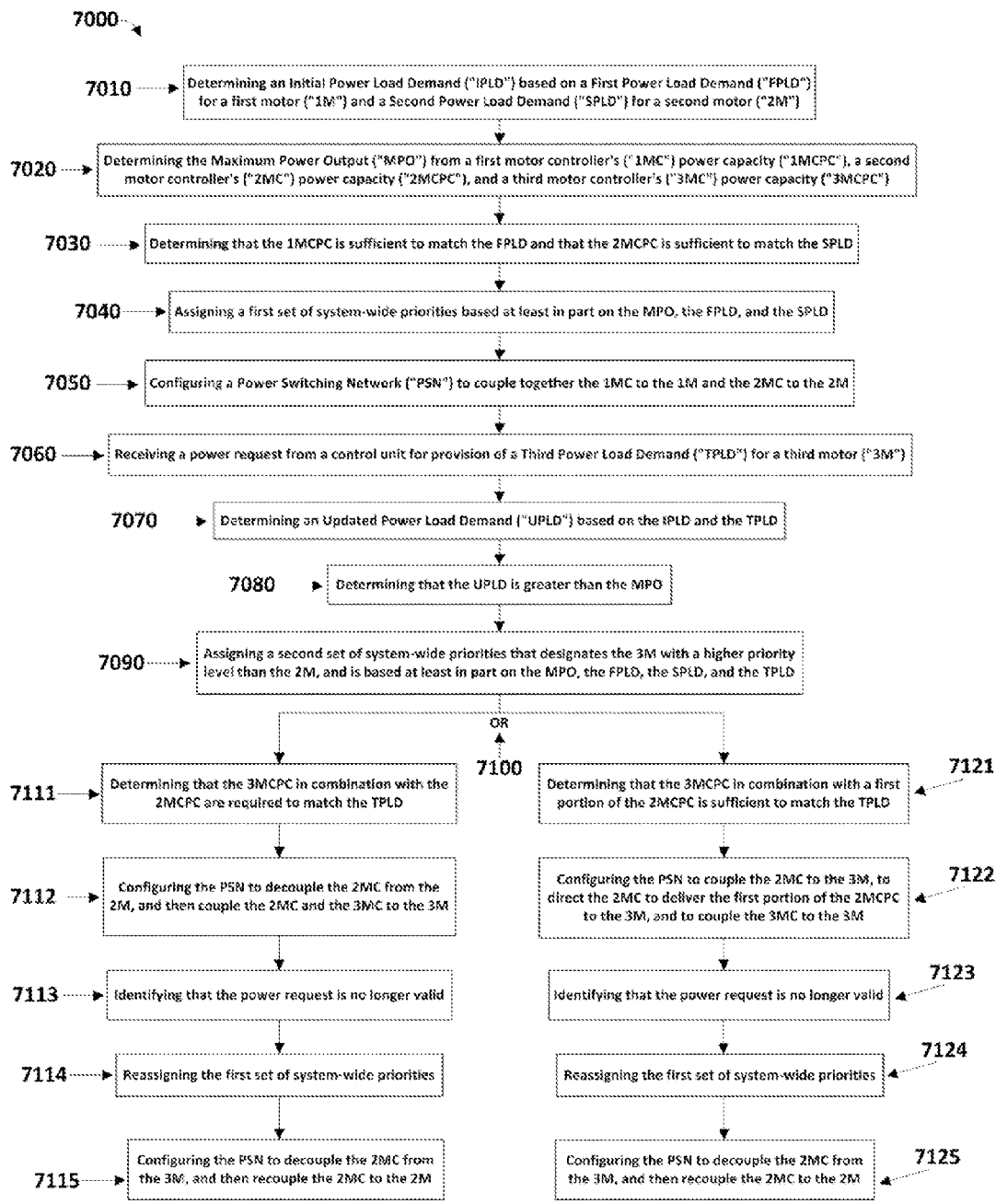
FIG. 7 is a flow diagram illustrating a preferred embodiment elaborating on the control and operation of the prior art method for controlling a group of motors.

Turning now to FIG. 7, an illustrative routine 7000 for controlling a group of motors 108 through load shedding and reconfiguration will now be described. The routine 7000 begins at operation 7010, by determining an Initial Power Load Demand based on a First Power Load Demand for a First Motor and a Second Power Load Demand for a second motor. The next step, at operation 7020, includes determining the Maximum Power Output from a first motor controller's power capacity, a second motor controller's power capacity, and a third motor controller's capacity. The next step, at operation 7030, includes determining that the first motor controller's power capacity is sufficient to match the First Power Load Demand and that the second motor controller's power capacity is sufficient to match the Second Power Load Demand. The next step, at operation 7040, includes assigning a first set of system-wide priorities based at least in part on the Maximum Power Output, the First Power Load Demand, and the Second Power Load Demand. The next step, at operation 7050, includes configuring a Power Switching Network to couple together the first motor controller to the First Motor and the second motor controller to the Second Motor. The next step, at operation 7070, includes determining an Updated Power Load Demand based on the Initial Power Load Demand and the Third Power Load Demand. The next step, at operation 7060, includes receiving a power request from a control unit for provision of a Third Power Load Demand for a Third Motor. The next step, at operation 7070, includes determining an Updated Power Load Demand based on the Initial Power Load Demand and the Third Power Load Demand Continuing with FIG. 7, following the determination of the Updated Power Load Demand, the next step, at operation 7080, includes determining that the Updated Power Load Demand is greater than the Maximum Power Output. The next step, at operation 7090, includes assigning a second set of system-wide priorities that designates the Third Motor with a higher priority level than the Second Motor, and is based at least in part on the Maximum Power Output, the First Power Load Demand, the Second Power Load Demand, and the Third Power Load Demand. The 'OR' split, at step 7100, represents the two alternative embodiments of the present invention, wherein starting at step 7111, the parallel motor controller architecture reconfigures its resources by completely diverting power away from one motor and towards another, whereas starting at step 7121, the parallel motor controller architecture adapts to requests for power by higher priority motors by only diverting the amount of power needed, while it is needed.

The reconfiguration embodiment, at step 7111, includes determining that the third motor controller's power capacity, in combination with the second motor controller's power capacity, are required to match the Third Power Load Demand. The next step, at operation 7112, includes configuring the Power Switching Network to decouple the second motor controller from the Second Motor, and then couple the second motor controller and the third motor controller to the Third Motor. The next step, at operation 7113, includes identifying that the power request is no longer valid. The next step, at operation 7114, includes reassigning the first set of system-wide priorities. The final step of this embodiment, at operation 7115, includes configuring the Power Switching Network to decouple the second motor controller from the Third Motor, and then recouple the second motor controller to the Second Motor.

The load shedding embodiment, at step 7121, includes determining that the third motor controller's power capacity, in combination with a first portion of the second motor controller's power capacity is sufficient to match the Third Power Load Demand. The next step, at operation 7122, includes configuring the Power Switching Network to couple the second motor controller to the Third Motor, to direct the second motor controller to deliver the first portion of the second motor controller's power capacity to the Third Motor, and to couple the third motor controller to the Third Motor. The next step, at operation 7123, includes identifying that the power request is no longer valid. The next step, at operation 7124, includes reassigning the first set of system-wide priorities. The final step of this embodiment, at operation 7125, includes configuring the Power Switching Network to decouple the second motor controller from the Third Motor, and then recouple the second motor controller to the Second Motor thereby fully matching the Second Power Load Demand.

Figure 8:
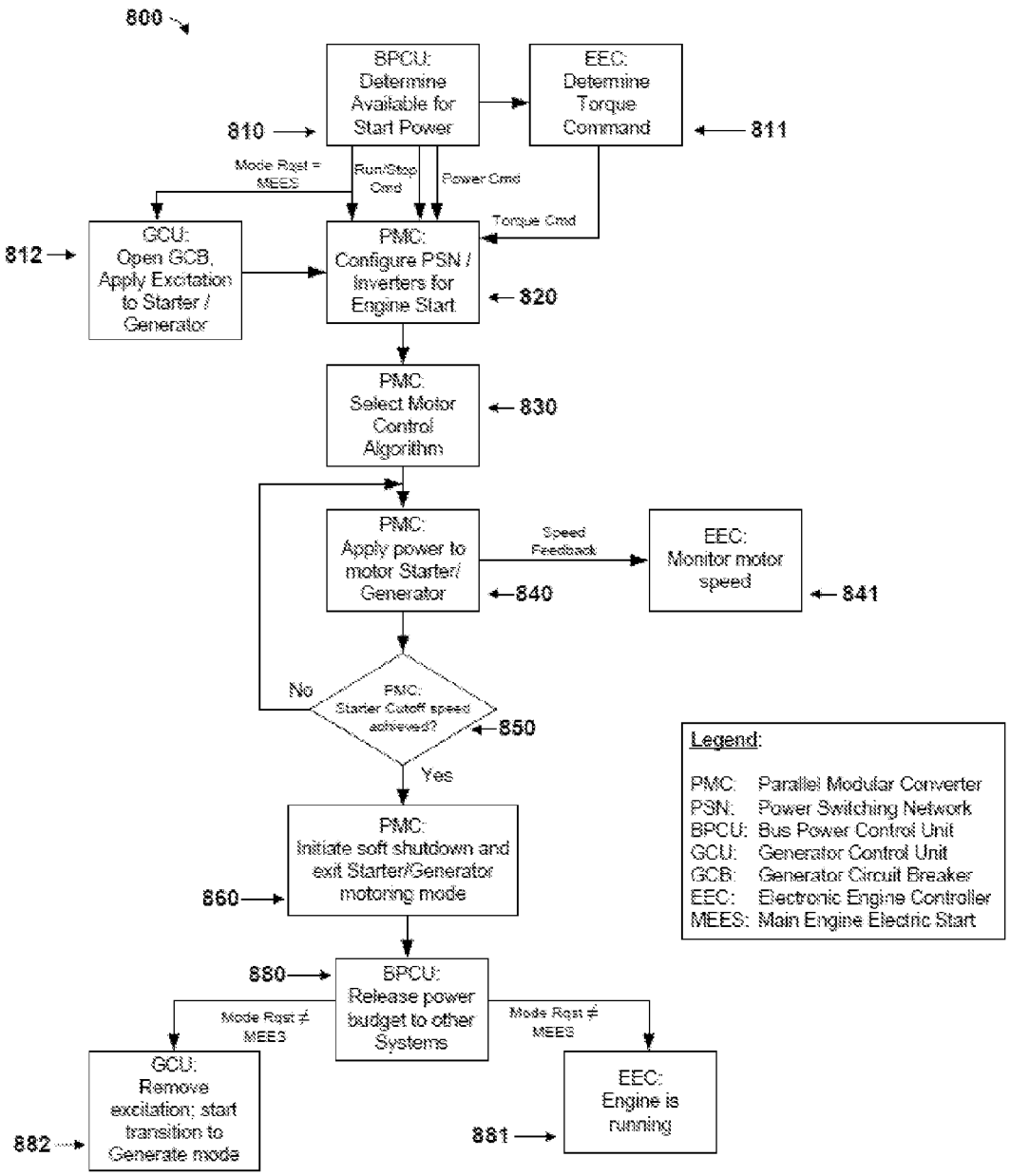
FIG. 8 is a flow diagram illustrating a preferred embodiment elaborating on the control and operation of the prior art method for controlling a group of motors, specifically directed to a novel main engine electric start operating logic.

Turning now to FIG. 8, an illustrative routine 800 specifically directed to a novel main engine electric start operating logic will now be described. The routine 800 begins at operation 810, where the Bus Power Control Unit will determine how much power is available for the Parallel Modular Converter. At operation 820 the Parallel Modular Converter configures the Power Switching Network for engine start and that operation is informed by the Electronic Engine Controller's determination of torque 811 (which it communicates to the Parallel Modular Converter), and operation of the Generator Control Unit to open the Generator Circuit Breaker and apply excitation to the starter/generator 812. At operation 830 the Parallel Modular Converter selects the appropriate motor control algorithm based on the information it has available to it. At operation 840 the Parallel Modular Converter applies power to the motor starter/generator and speed feedback information is shared between the Parallel Modular Converter and the Electronic Engine Controller that monitors motor speed 841. At operation 850 if the starter cutoff speed is not achieved then operation 840 begins again, however, if the starter cutoff speed is achieved, then the Parallel Modular Converter will initiate a soft shutdown and exit the starter/generator motoring mode 860. At operation 880 the Bus Power Control Unit will release the power budget to other systems, and will communicate to the Electronic Engine Controller and Generator Control Unit that the mode is no longer set for the the Main Engine Electric Start, then operations 881 and 882 will begin. At operation 881 the Electronic Engine Controller engine is running, while at operation 882 the Generator Control Unit will remove excitation and start transition to a generate mode.

Figure 9:
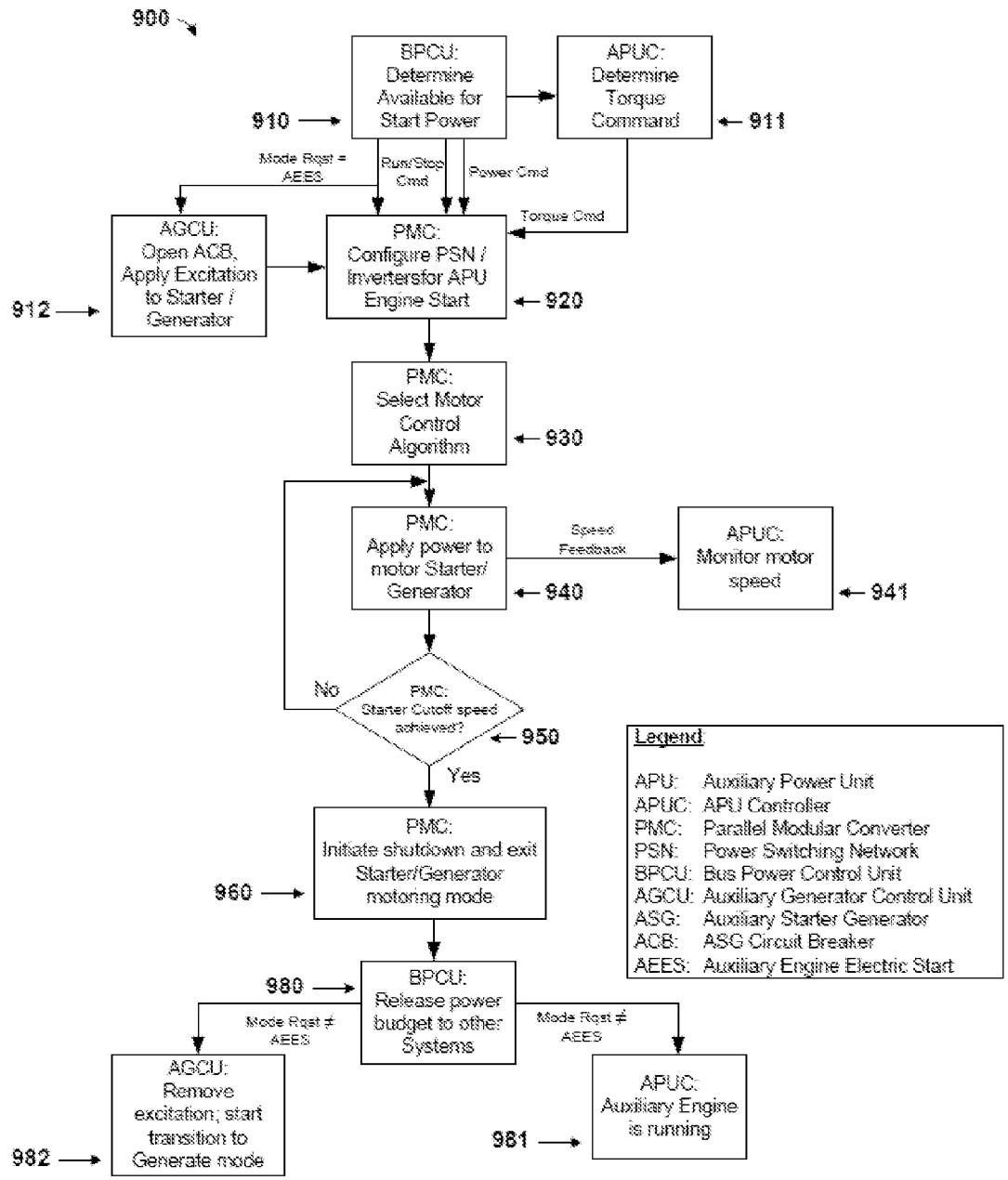
FIG. 9 is a flow diagram illustrating a preferred embodiment elaborating on the control and operation of the prior art method for controlling a group of motors, specifically directed to a novel Auxiliary Power Unit engine electric start operating logic.

Turning now to FIG. 9, an illustrative routine 900 specifically directed to a novel auxiliary power unit engine electric start operating logic will now be described. The routine 900 begins at operation 910, where the Bus Power Control Unit will determine how much power is available for the Parallel Modular Converter. At operation 920 the Parallel Modular Converter configures the Power Switching Network for engine start and that operation is informed by the Auxiliary Power Unit Controller's determination of torque 911 (which it communicates to the Parallel Modular Converter), and operation of the Auxiliary Generator Control Unit to open the Auxiliary Starter Generator Circuit Breaker and apply excitation to the starter/generator 912. At operation 930 the Parallel Modular Converter selects the appropriate motor control algorithm based on the information it has available to it. At operation 940 the Parallel Modular Converter applies power to the motor starter/generator and speed feedback information is shared between the Parallel Modular Converter and the Auxiliary Power Unit Controller that monitors motor speed 941. At operation 950 if the starter cutoff speed is not achieved then operation 940 begins again, however, if the starter cutoff speed is achieved, then the Parallel Modular Converter will initiate a soft shutdown and exit the starter/generator motoring mode 960. At operation 980 the Bus Power Control Unit will release the power budget to other systems, and will communicate to the Auxiliary Power Unit Controller and the Auxiliary Generator Control Unit that the mode is no longer set for the Auxiliary Engine Electric Start and then operations 981 and 982 will begin. At operation 981 the auxiliary engine is running, while at operation 982 the Auxiliary Generator Control Unit will remove excitation and start transition to a generate mode.

Figure 10:
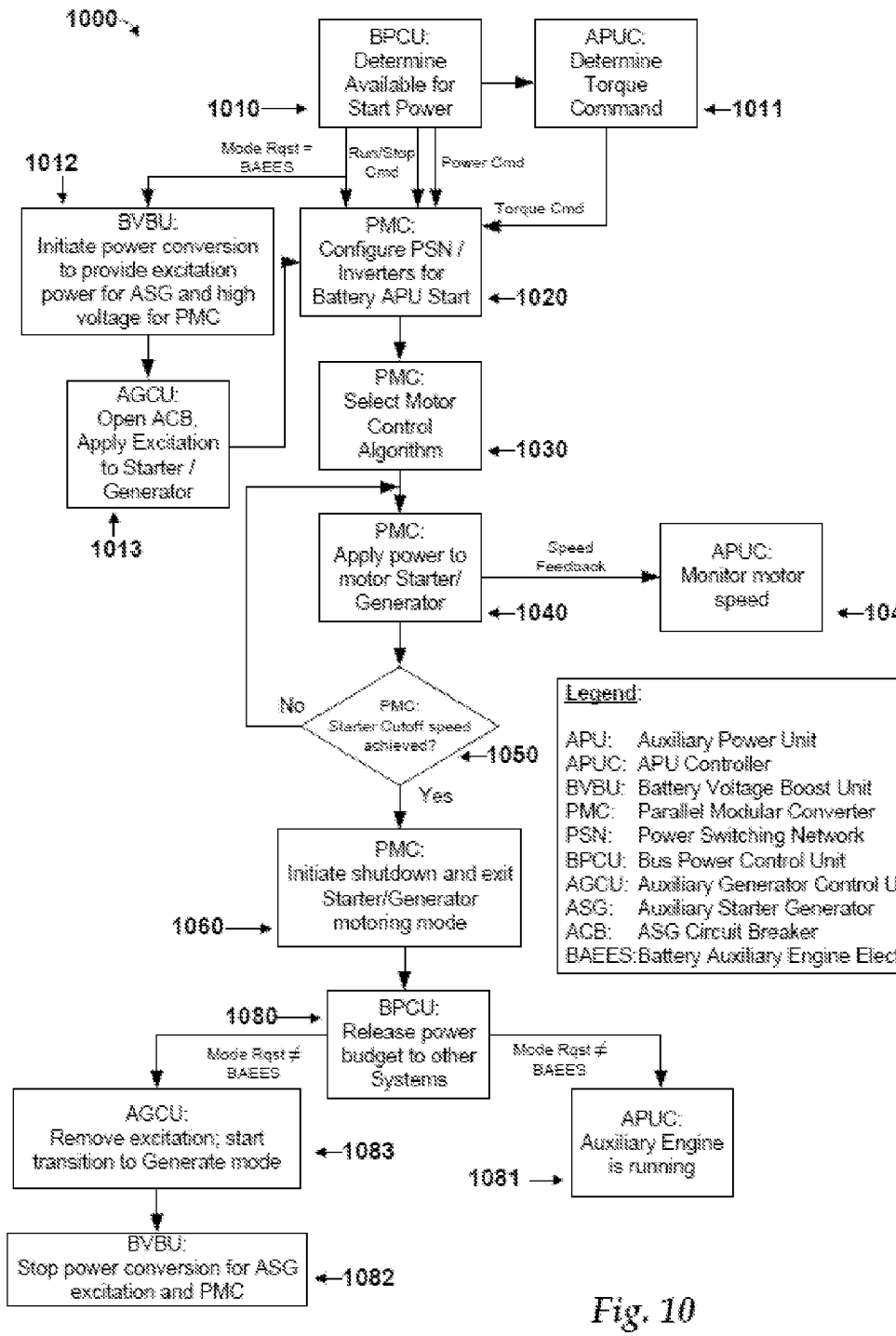
FIG. 10 is a flow diagram illustrating a preferred embodiment elaborating on the control and operation of the prior art method for controlling a group of motors, specifically directed to a novel battery sourced Auxiliary Power Unit engine electric start operating logic.

Turning now to FIG. 10, an illustrative routine 1000 specifically directed to a novel battery sourced Auxiliary Power Unit engine electric start operating logic will now be described. The routine 1000 begins at operation 1010, where the Bus Power Control Unit will determine how much power is available for the Parallel Modular Converter. At operation 1020 the Parallel Modular Converter configures the Power Switching Network for battery auxiliary power unit start and that operation is informed by the Auxiliary Power Unit Controller's determination of torque 1011 (which it communicates to the Parallel Modular Converter), and operation of the Auxiliary Generator Control Unit to open the Auxiliary Starter Generator Circuit Breaker and apply excitation to the starter/generator 1013. Note: prior to operation 1013 by the Auxiliary Generator Control Unit, at operation 1012 the Battery Voltage Boost Unit initiates power conversion to provide excitation power for an auxiliary starter generator and high voltage for the Parallel Modular Converter. At operation 1030 the Parallel Modular Converter selects the appropriate motor control algorithm based on the information it has available to it. At operation 1040 the Parallel Modular Converter applies power to the motor starter/generator and speed feedback information is shared between the Parallel Modular Converter and the Auxiliary Power Unit Controller that monitors motor speed 1041. At operation 1050 if the starter cutoff speed is not achieved then operation 1040 begins again, however, if the starter cutoff speed is achieved, then the Parallel Modular Converter will initiate a soft shutdown and exit the starter/generator motoring mode 1060. At operation 1080 the Bus Power Control Unit will release the power budget to other systems, and will communicate to the Auxiliary Power Unit Controller and the Auxiliary Generator Control Unit that the mode is no longer set for the Battery Auxiliary Engine Electric Start then operations 1081 and 1083 will begin. At operation 1081 the auxiliary engine is running, while at operation 1083 the Auxiliary Generator Control Unit will remove excitation and start transition to a generate mode, while at operation 1082 the Battery Voltage Boost Unit will stop power conversion for the Auxiliary Starter Generator excitation and the Parallel Modular Converter.

Figure 11:
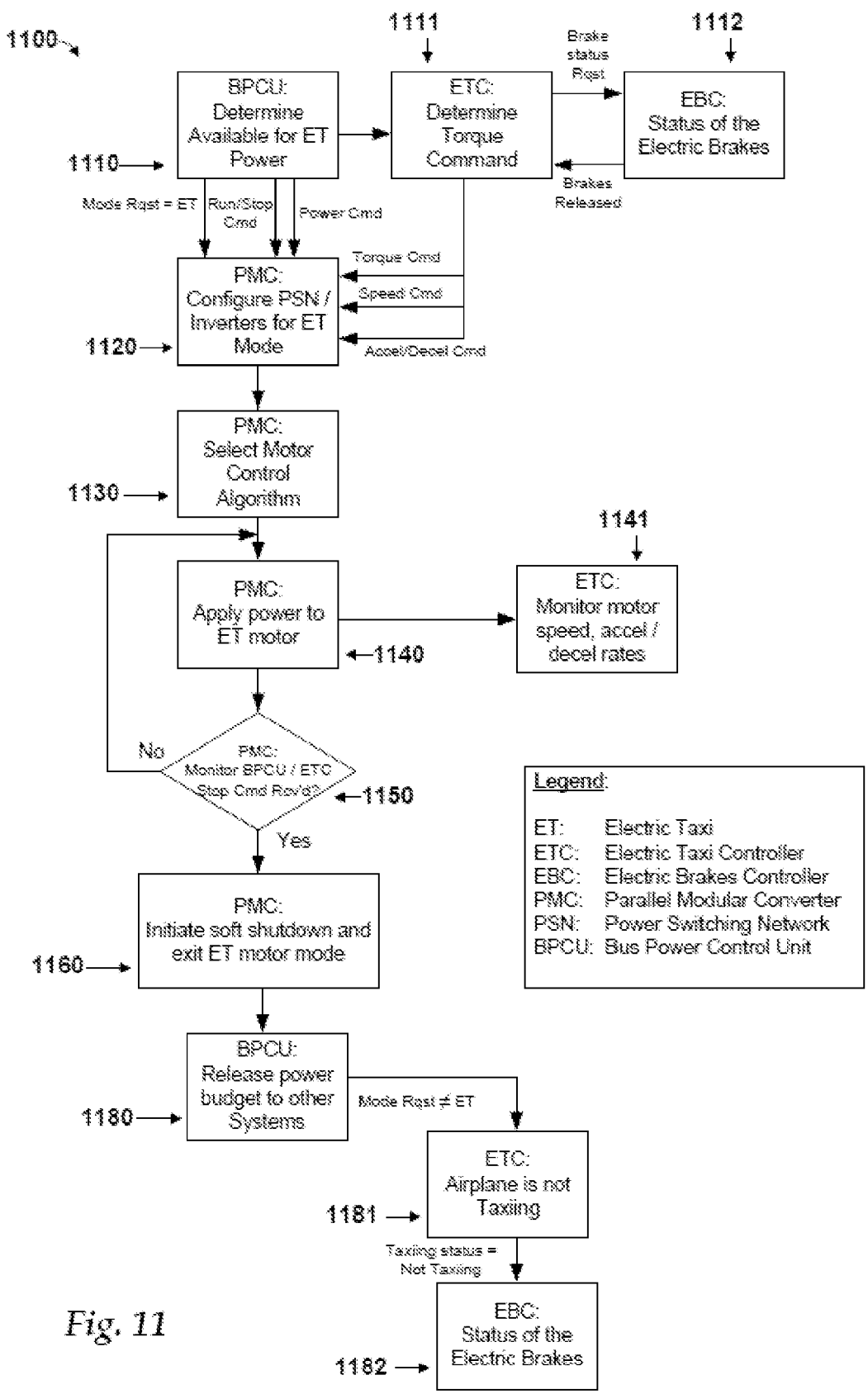
FIG. 11 is a flow diagram illustrating a preferred embodiment elaborating on the control and operation of the prior art method for controlling a group of motors, specifically directed to a novel electric taxiing operating logic.

Turning now to FIG. 11, an illustrative routine 1100 specifically directed to a novel electric taxiing operating logic will now be described. The routine 1100 begins at operation 1110, where the Bus Power Control Unit will determine how much power is available for the Parallel Modular Converter. At operation 1120 the Parallel Modular Converter configures the Power Switching Network for Electric Taxi mode and that operation is informed by the Electric Taxi Controller's determination of torque, speed and acceleration/deceleration 1111 (which it communicates to the Parallel Modular Converter), and operation of the Electric Brakes Controller reporting the status of the brakes 1112. At operation 1130 the Parallel Modular Converter selects the appropriate motor control algorithm based on the information it has available to it. At operation 1140 the Parallel Modular Converter applies power to the Electric Taxi motor and speed, acceleration, and deceleration feedback information is shared between the Parallel Modular Converter and the Electric Taxi Controller that monitors motor speed, acceleration, and deceleration rates 1141. At operation 1150 the Parallel Modular Converter monitors the Bus Power Control Unit and the Electric Taxi Controller, and if a stop command has not been received then operation 1140 begins again, however, if a stop command has been received, then the Parallel Modular Converter will initiate a soft shutdown and exit the Electric Taxi motor mode 1160. At operation 1180 the Bus Power Control Unit will release the power budget to other systems, and will communicate to the Electric Taxi Controller that the mode is no longer set for the Electric Taxiing and then operation 1181 will begin. At operation 1181 the airplane is not taxiing, and at operation 1182 the Electric Brakes Controller provides the status of the electric brakes.

Figure 12:
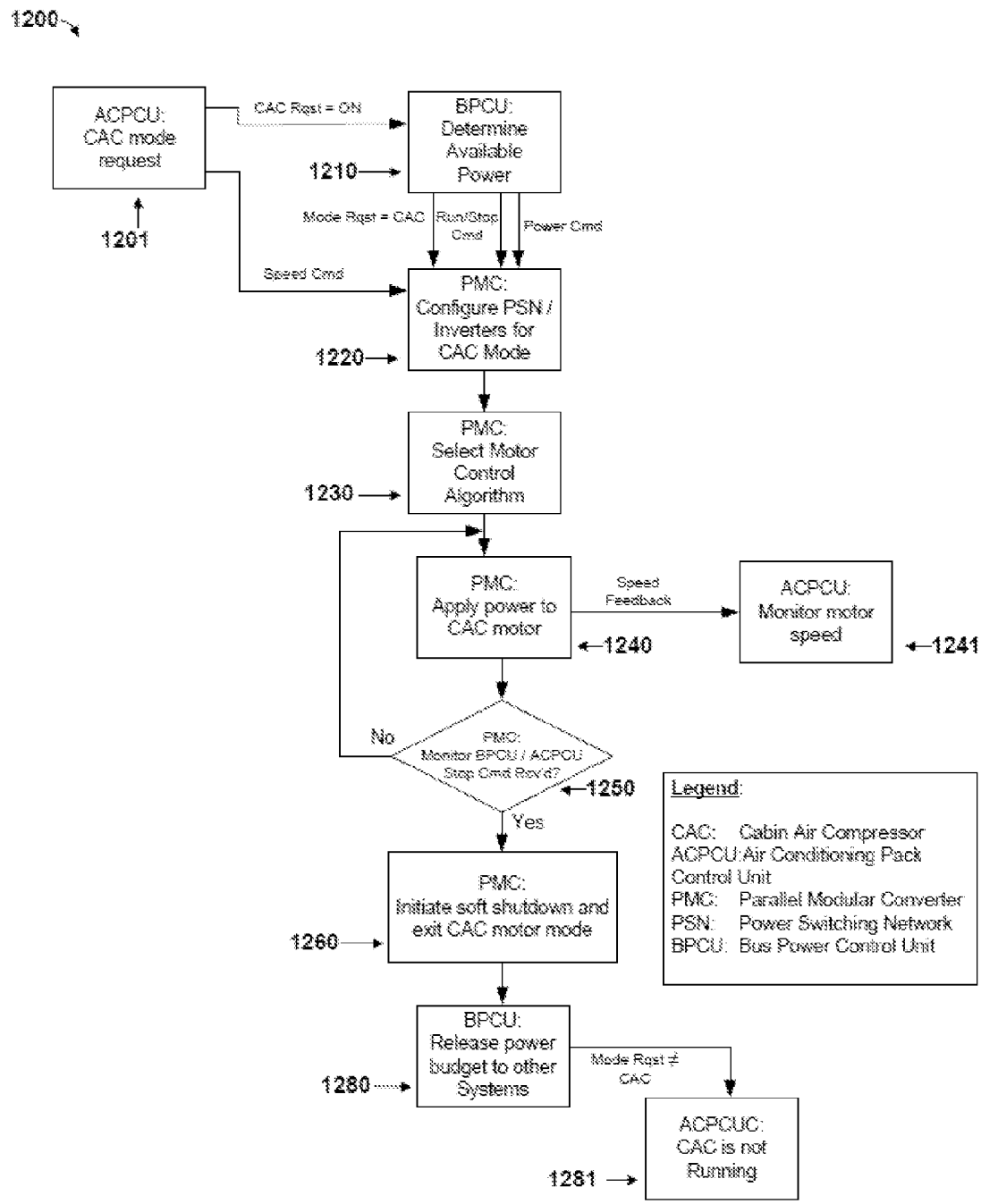
FIG. 12 is a flow diagram illustrating a preferred embodiment elaborating on the control and operation of the prior art method for controlling a group of motors, specifically directed to a novel cabin air compressor operating logic.

Turning now to FIG. 12, an illustrative routine 1200 specifically directed to a novel cabin air compressor operating logic will now be described. The routine 1200 begins at operation 1201, where there is a Cabin Air Compressor mode request at an Air Conditioning Pack Control Unit. At operation 1210 the Bus Power Control Unit will determine how much power is available for the Parallel Modular Converter. At operation 1220 the Parallel Modular Converter configures the Power Switching Network for Cabin Air Compressor mode and that operation is informed by the Air Conditioning Pack Control Unit's speed command (which it communicates to the Parallel Modular Converter). At operation 1230 the Parallel Modular Converter selects the appropriate motor control algorithm based on the information it has available to it. At operation 1240 the Parallel Modular Converter applies power to the Cabin Air Compressor motor and speed feedback information is shared between the Parallel Modular Converter and the Air Conditioning Pack Control Unit that monitors motor speed 1241. At operation 1250 the Parallel Modular Converter monitors the Bus Power Control Unit and the Air Conditioning Pack Control Unit Controller, and if a stop command has not been received then operation 1240 begins again, however, if a stop command has been received, then the Parallel Modular Converter will initiate a soft shutdown and exit the Cabin Air Compressor motor mode 1260. At operation 1280 the Bus Power Control Unit will release the power budget to other systems, and will communicate to the Air Conditioning Pack Control Unit that the mode is no longer set for the Cabin Air Compressor and then operation 1281 will begin. At operation 1281 the Cabin Air Compressor is not running.

Figure 13:
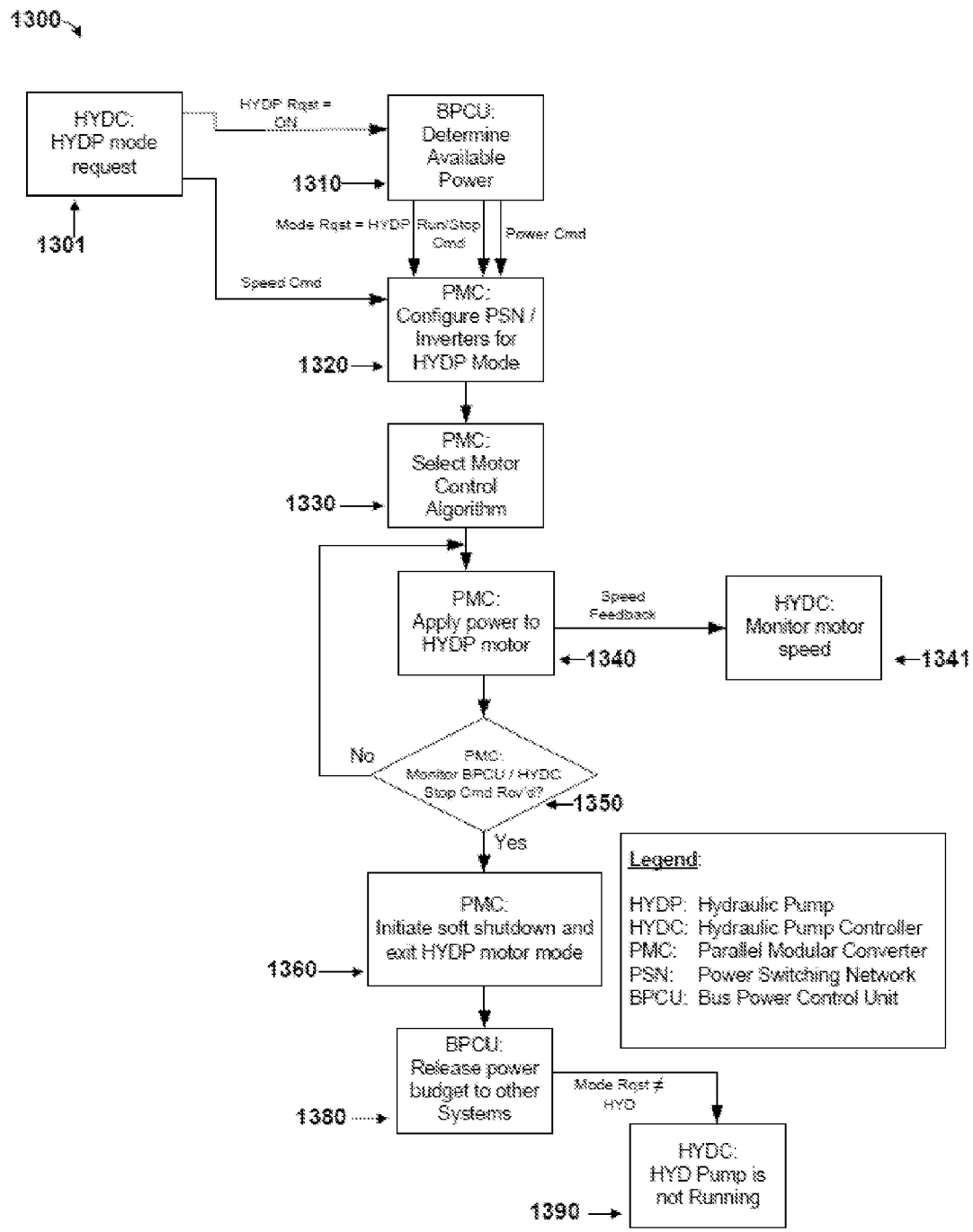
FIG. 13 is a flow diagram illustrating a preferred embodiment elaborating on the control and operation of the prior art method for controlling a group of motors, specifically directed to a novel hydraulic pump operating logic.

Turning now to FIG. 13, an illustrative routine 1300 specifically directed to a novel hydraulic pump operating logic will now be described. The routine 1300 begins at operation 1301, where there is a Hydraulic Pump mode request at a Hydraulic Pump Controller. At operation 1310 the Bus Power Control Unit will determine how much power is available for the Parallel Modular Converter. At operation 1320 the Parallel Modular Converter configures the Power Switching Network for Hydraulic Pump mode and that operation is informed by the Hydraulic Pump Controller's speed command (which it communicates to the Parallel Modular Converter). At operation 1330 the Parallel Modular Converter selects the appropriate motor control algorithm based on the information it has available to it. At operation 1340 the Parallel Modular Converter applies power to the Hydraulic Pump motor and speed feedback information is shared between the Parallel Modular Converter and the Hydraulic Pump Controller that monitors motor speed 1341. At operation 1350 the Parallel Modular Converter monitors the Bus Power Control Unit and the Hydraulic Pump Controller, and if a stop command has not been received then operation 1340 begins again, however, if a stop command has been received, then the Parallel Modular Converter will initiate a soft shutdown and exit the Hydraulic Pump motor mode 1360. At operation 1380 the Bus Power Control Unit will release the power budget to other systems, and will communicate to the Hydraulic Pump Controller that the mode is no longer set for the Hydraulic Pump and then operation 1390 will begin. At operation 1390 the Hydraulic Pump is not running.

Figure 14:
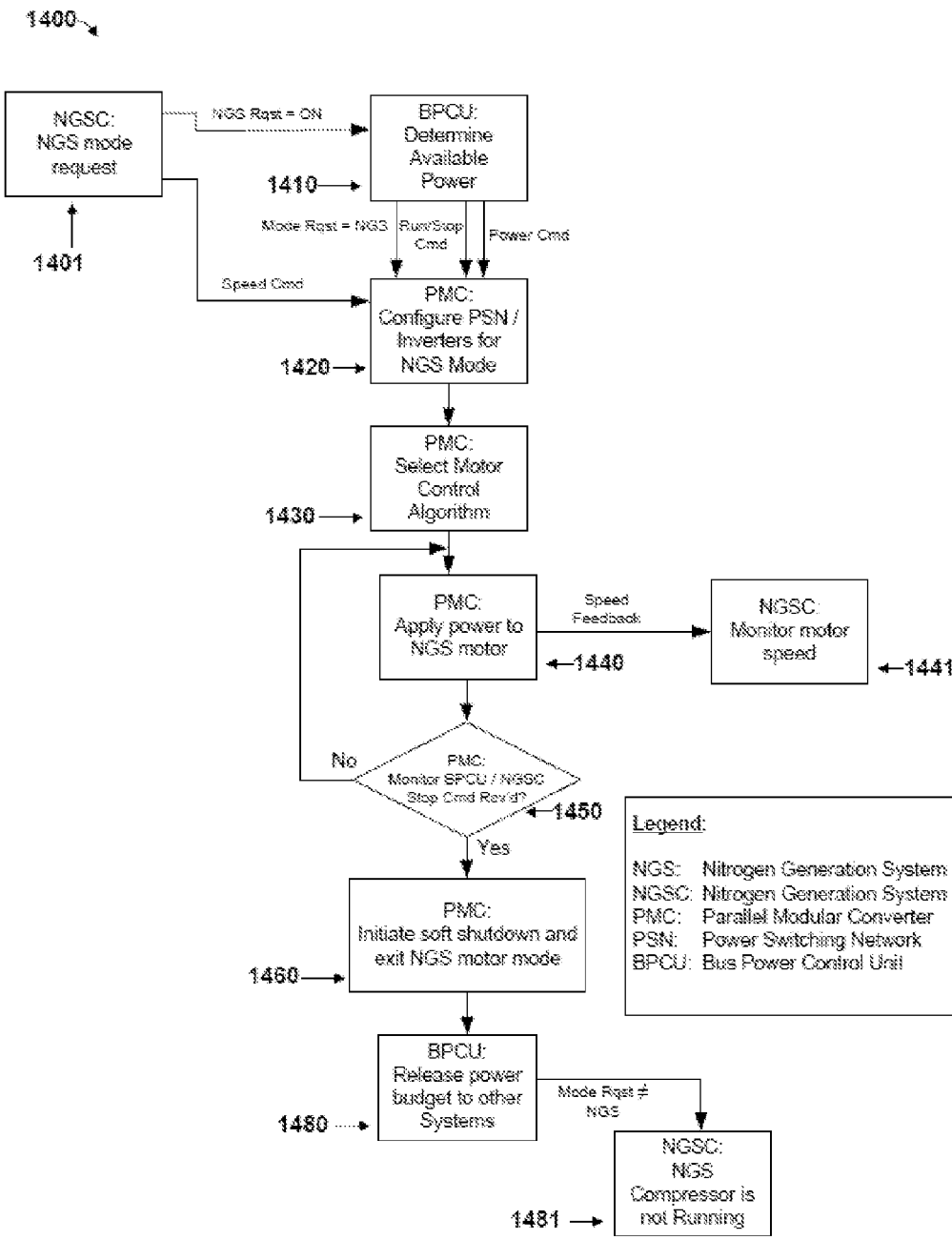
FIG. 14 is a flow diagram illustrating a preferred embodiment elaborating on the control and operation of the prior art method for controlling a group of motors, specifically directed to a novel nitrogen generation system operating logic.

Turning now to FIG. 14, an illustrative routine 1400 specifically directed to a novel nitrogen generation system operating logic will now be described. The routine 1400 begins at operation 1401, where there is a Nitrogen Generation System mode request at a Nitrogen Generation System Controller. At operation 1410 the Bus Power Control Unit will determine how much power is available for the Parallel Modular Converter. At operation 1420 the Parallel Modular Converter configures the Power Switching Network for Nitrogen Generation System mode and that operation is informed by the Nitrogen Generation System Controller's speed command (which it communicates to the Parallel Modular Converter). At operation 1430 the Parallel Modular Converter selects the appropriate motor control algorithm based on the information it has available to it. At operation 1440 the Parallel Modular Converter applies power to the Nitrogen Generation System motor and speed feedback information is shared between the Parallel Modular Converter and the Nitrogen Generation System Controller that monitors motor speed 1441. At operation 1450 the Parallel Modular Converter monitors the Bus Power Control Unit and the Nitrogen Generation System Controller, and if a stop command has not been received then operation 1440 begins again, however, if a stop command has been received, then the Parallel Modular Converter will initiate a soft shutdown and exit the Nitrogen Generation System motor mode 1460. At operation 1480 the Bus Power Control Unit will release the power budget to other systems, and will communicate to the Nitrogen Generation System Controller that the mode is no longer set for the Nitrogen Generation System and then operation 1481 will begin. At operation 1481 the Nitrogen Generation System compressor is not running.

Figure 15:
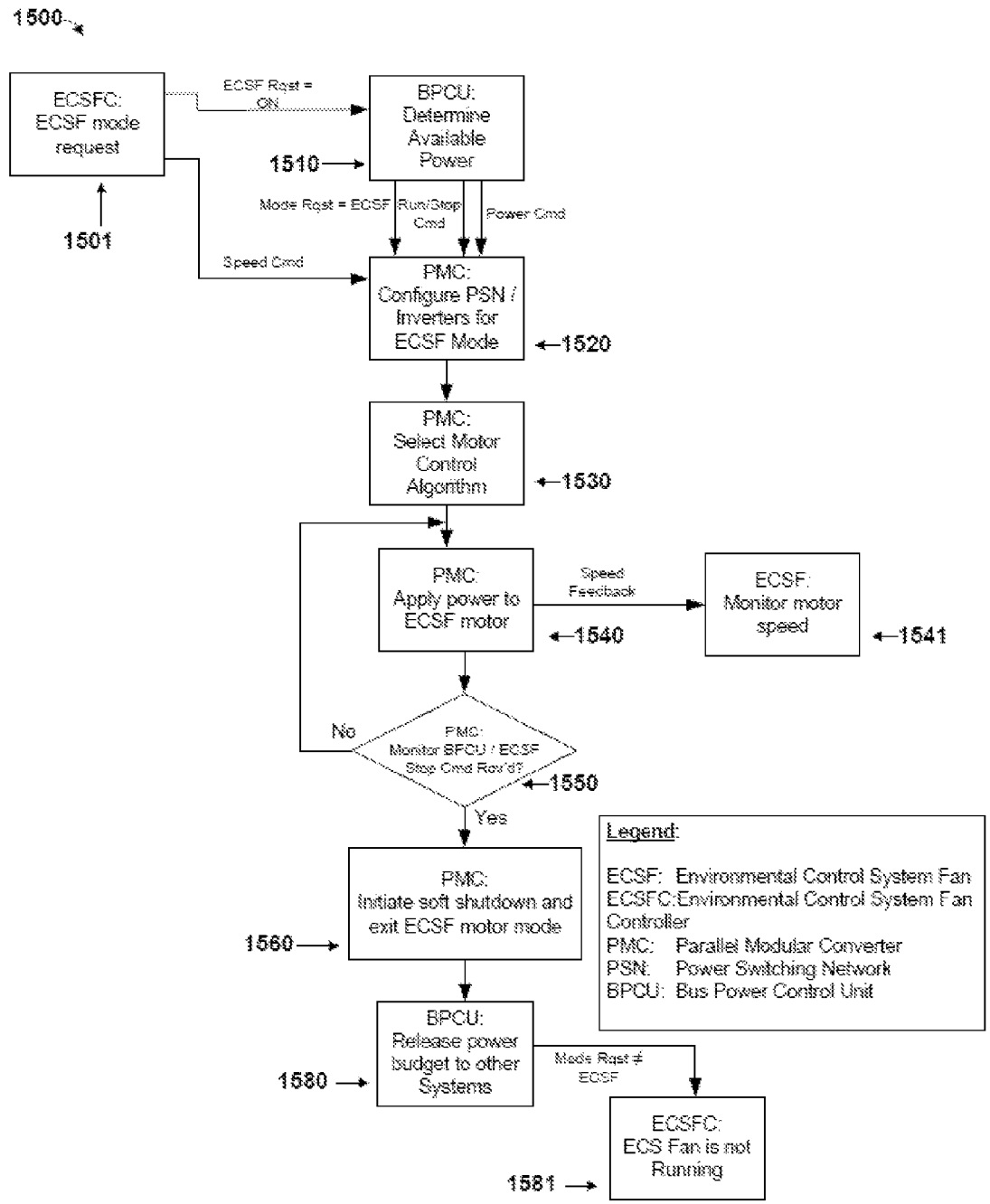
FIG. 15 is a flow diagram illustrating a preferred embodiment elaborating on the control and operation of the prior art method for controlling a group of motors, specifically directed to a novel environmental control system fan operating logic.

Turning now to FIG. 15, an illustrative routine 1500 specifically directed to a novel environmental control system fan operating logic will now be described. The routine 1500 begins at operation 1501, where there is an Environmental Control System Fan mode request at an Environmental Control System Fan Controller. At operation 1510 the Bus Power Control Unit will determine how much power is available for the Parallel Modular Converter. At operation 1520 the Parallel Modular Converter configures the Power Switching Network for Environmental Control System Fan mode and that operation is informed by the Environmental Control System Fan Controller's speed command (which it communicates to the Parallel Modular Converter). At operation 1530 the Parallel Modular Converter selects the appropriate motor control algorithm based on the information it has available to it. At operation 1540 the Parallel Modular Converter applies power to the Environmental Control System Fan motor and speed feedback information is shared between the Parallel Modular Converter and the Environmental Control System Fan Controller that monitors motor speed 1541. At operation 1550 the Parallel Modular Converter monitors the Bus Power Control Unit and the Environmental Control System Fan Controller, and if a stop command has not been received then operation 1540 begins again, however, if a stop command has been received, then the Parallel Modular Converter will initiate a soft shutdown and exit the Environmental Control System Fan motor mode 1560. At operation 1580 the Bus Power Control Unit will release the power budget to other systems, and will communicate to the Environmental Control System Fan Controller that the mode is no longer set for the Environmental Control System Fan and then operation 1581 will begin. At operation 1581 the Environmental Control System Fan is not running.

Figure 16:
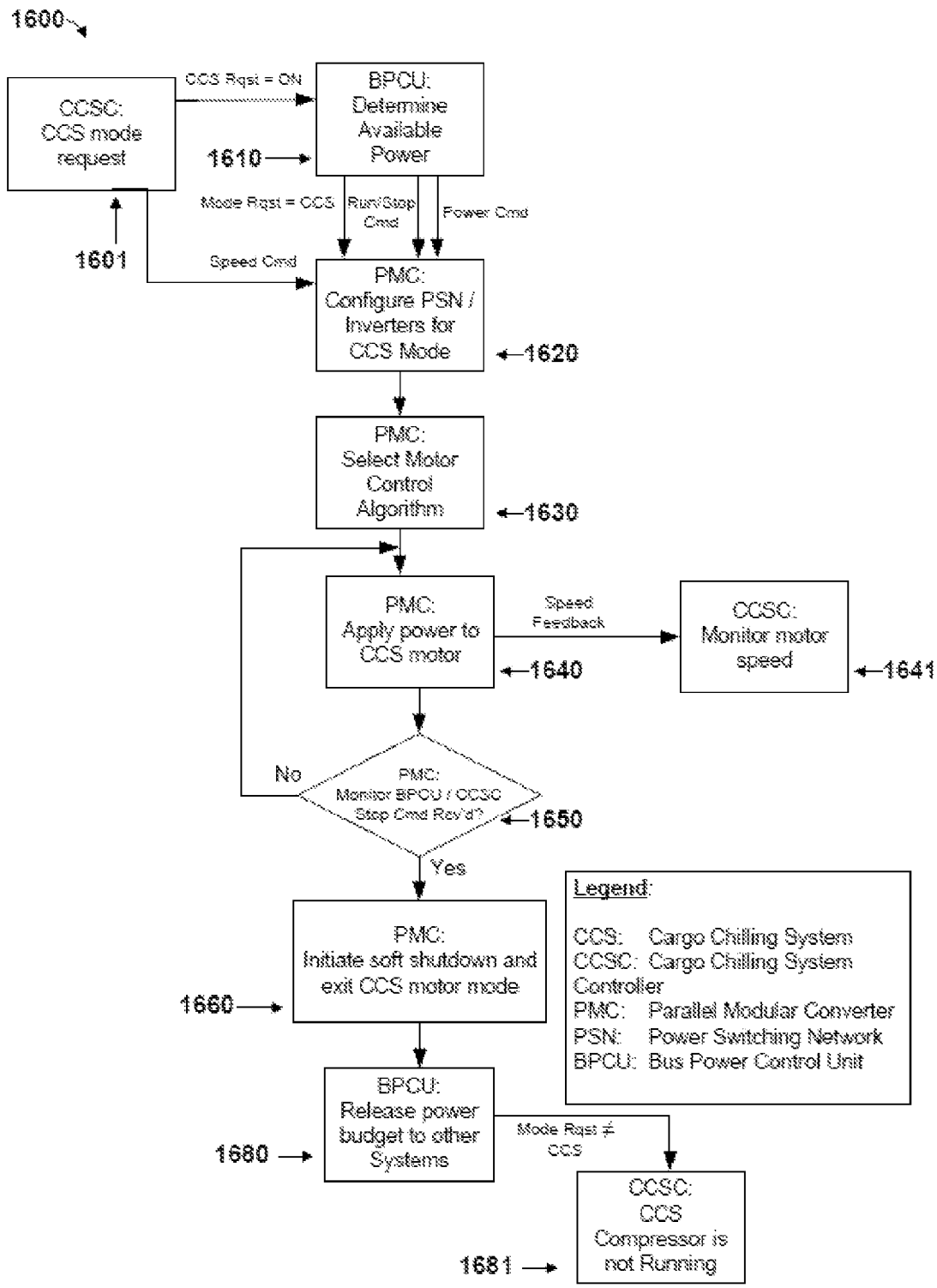
FIG. 16 is a flow diagram illustrating a preferred embodiment elaborating on the control and operation of the prior art method for controlling a group of motors, specifically directed to a novel cargo refrigeration system operating logic.

Turning now to FIG. 16, an illustrative routine 1600 specifically directed to a novel cargo refrigeration system operating logic will now be described. The routine 1600 begins at operation 1601, where there is a Cargo Chilling System mode request at a Cargo Chilling System Controller. At operation 1610 the Bus Power Control Unit will determine how much power is available for the Parallel Modular Converter. At operation 1620 the Parallel Modular Converter configures the Power Switching Network for Cargo Chilling System mode and that operation is informed by the Cargo Chilling System Controller's speed command (which it communicates to the Parallel Modular Converter). At operation 1630 the Parallel Modular Converter selects the appropriate motor control algorithm based on the information it has available to it. At operation 1640 the Parallel Modular Converter applies power to the Cargo Chilling System motor and speed feedback information is shared between the Parallel Modular Converter and the Cargo Chilling System Controller that monitors motor speed 1641. At operation 1650 the Parallel Modular Converter monitors the Bus Power Control Unit and the Cargo Chilling System Controller, and if a stop command has not been received then operation 1640 begins again, however, if a stop command has been received, then the Parallel Modular Converter will initiate a soft shutdown and exit the Cargo Chilling System motor mode 1660. At operation 1680 the Bus Power Control Unit will release the power budget to other systems, and will communicate to the Cargo Chilling System Controller that the mode is no longer set for the Cargo Chilling System and then operation 1681 will begin. At operation 1681 the Cargo Chilling System compressor is not running.

Figure 17:
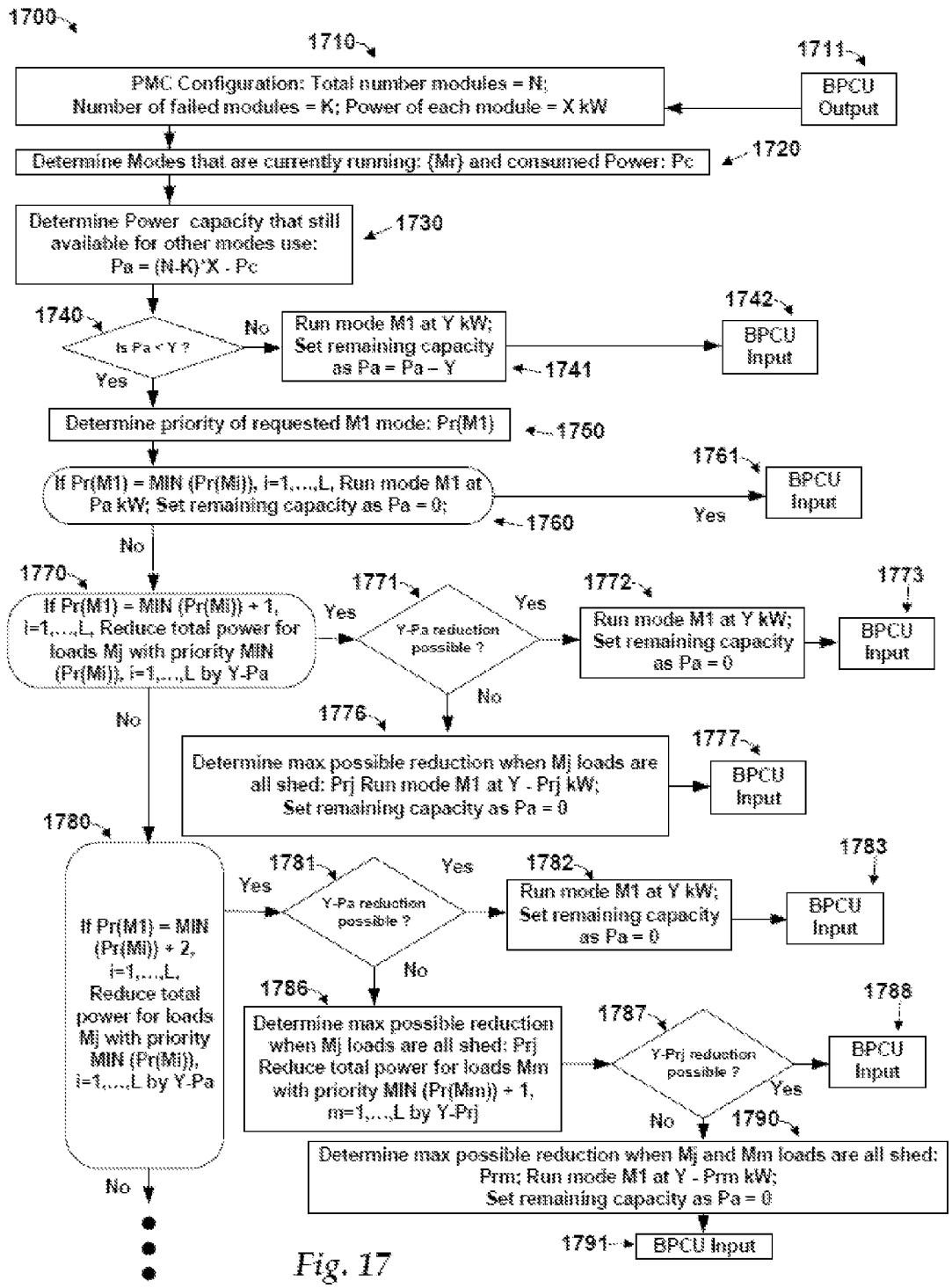
FIG. 17 is a flow diagram illustrating a preferred embodiment elaborating on the control and operation of the prior art method for controlling a group of motors, specifically directed to a novel load shed and reconfiguration operating logic.

Turning now to FIG. 17, an illustrative routine 1700 specifically directed to a novel load shed and reconfiguration operating logic will now be described as a preferred embodiment of the present invention. The routine 1700 begins at operation 1710, wherein the Parallel Modular Converter receives the Bus Power Control Unit output (communicating a particular mode request and the power associated with that mode) and the Parallel Modular Converter's configuration is established including the total number of motor controllers (or modules), the power of each, and if any have failed. The next step, at operation 1720, a determination is made as to what modes are currently running and what power is getting consumed as a result of those running modes. At step 1730, a determination is made as to the current power capacity that is still available for other modes use. At step 1740, a decision is made, if the current power capacity is not less than the power needed for the mode requested by the Bus Power Control Unit, then the Parallel Modular Converter runs the requested mode at the requested capacity, the Parallel Modular Converter system reduces its remaining power capacity to account for the running of this new mode 1741 and the Bus Power Control Unit is informed about this at step 1742. If the current power capacity is less than the power needed for the requested mode, then a determination of priority of the requested mode is made relative to other running modes 1750. If the priority of the requested mode is less than or equal to all other currently running modes, then the Parallel Modular Converter runs the requested mode at only the currently available capacity, the Parallel Modular Converter sets the remaining power capacity to zero 1760 and the Bus Power Control Unit is informed about that the requested mode is run with reduced power and that the Parallel Modular Converter available power capacity is zero.

At step 1770, if the priority of the requested mode is greater than at least one other currently running mode, and if it is possible to reduce the power delivered to that at least one other lower priority mode 1771, then the total power for any such modes with lower priority will be reduced so as to provide the balance of power needed to match the power requested for the requested mode, and the Parallel Modular Converter will run the requested mode and set the remaining power capacity to zero 1772 while informing the Bus Power Control Unit 1773 that a lower priority mode is running at a power lower than requested and that the total remaining Parallel Modular Converter power capacity is zero. At step 1776, if an incremental reduction in the power delivery for the lower priority modes is not possible, then a determination of the maximum possible reduction is calculated as a result of completely shutting down all lower priority modes, and the requested mode is provided with the power formerly directed to those lower priority modes.

At step 1780, if the priority of the requested mode is greater than at least two other currently running modes one of which has a greater priority than at least one other currently running mode, and if it is possible to reduce the power delivered to that at least one other lower priority modes 1781, then the total power for any such lowest priority modes will be reduced so as to provide the balance of power needed to match the power requested for the requested mode, and the Parallel Modular Converter will run the requested mode and will inform the Bus Power Control Unit which lower priority loads are run at lower power and that the remaining Parallel Modular Converter power capacity is zero 1782. At step 1786, if an incremental reduction in the power delivery for the lowest priority modes is not possible, then a determination of the maximum possible reduction is calculated as a result of completely shutting down all lowest priority modes and partially shutting down all modes with a priority lower than the requested mode but greater than the lowest priority modes, and the requested mode is provided with the power formerly directed to those lower priority modes. At step 1790, if the reduction in the power delivery described at step 1786 is not possible, then a determination of the maximum possible reduction is calculated as a result of completely shutting down all lower priority modes, and the requested mode is provided with the power formerly directed to those lower priority modes. This process may be repeated until it is ran for all lower priority modes and/or the requested mode receives all of the power it has requested or its request is no longer valid. One way in which incremental reductions may not be possible is that the requested mode is not operable with only the added amount of power provided by the incremental reductions.

Figure 18:
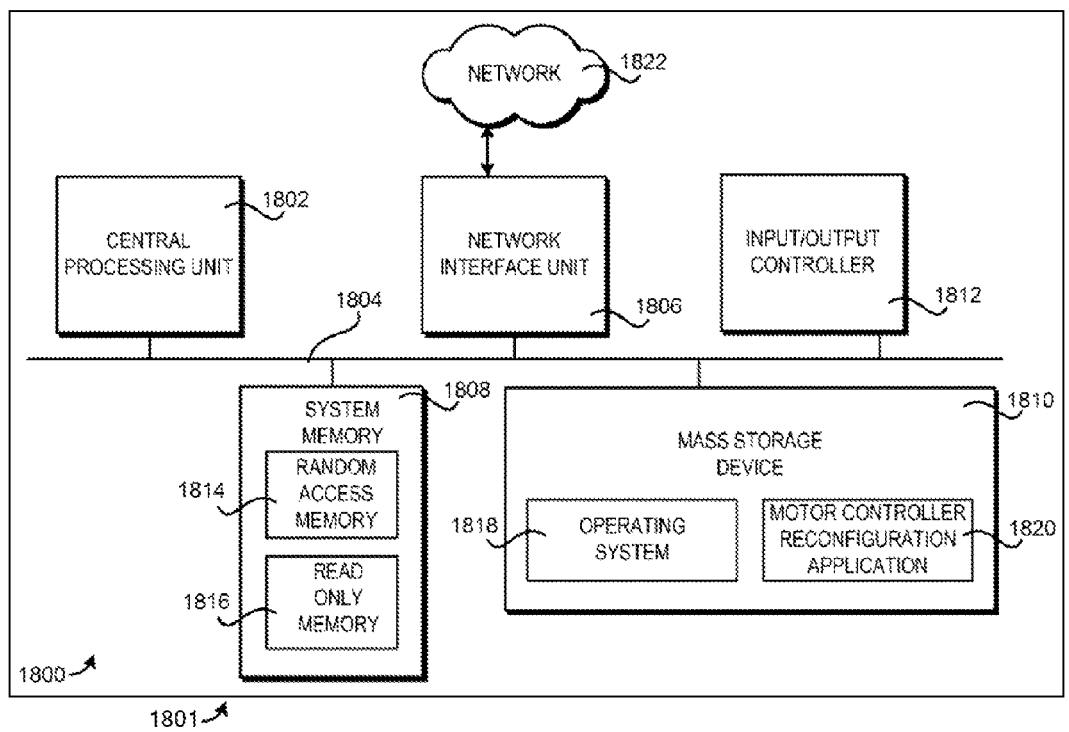
FIG. 18 is a computer architecture diagram showing an illustrative computer hardware and software architecture for a computing system capable of implementing aspects of the embodiments presented herein.

FIG. 18 shows an illustrative computer architecture for a computer 1800, housed within an aircraft 1801, capable of executing the software components described herein for providing power and to a group of motors 108 in the manner presented above. The computer architecture shown in FIG. 18 illustrates a conventional desktop, laptop, or server computer and may be utilized to execute any aspects of the methods presented herein. As described above, the computer 1800 may be a part of the power switching network 202 or may be communicatively linked to the power switching network 202. While the preferred embodiment is housed within an aircraft, alternative embodiments within the scope of the present invention may be implemented on systems contained within a jet aircraft, a propeller aircraft, a helicopter, a hovercraft, a land vehicle, a sea vehicle, or any other system independently controlling a series of motor controllers and motors.

The computer architecture shown in FIG. 18 includes a central processing unit 1802 (CPU), a system memory 1808, including a random access memory 1814 (RAM) and a read-only memory (ROM) 1816, and a system bus 1804 that couples the memory to the CPU 1802. A basic input/output system containing the basic routines that help to transfer information between elements within the computer 1800, such as during startup, is stored in the ROM 1816. The computer 1800 further includes a mass storage device 1810 for storing an operating system 1818, application programs, and other program modules, which are described in greater detail herein.

The mass storage device 1810 is connected to the CPU 1802 through a mass storage controller (not shown) connected to the bus 1804. The mass storage device 1810 and its associated computer-readable media provide non-volatile storage for the computer 1800. Although the description of computer-readable media contained herein refers to a mass storage device, such as a hard disk or CD-ROM drive, it should be appreciated by those skilled in the art that computer-readable media can be any available computer storage media that can be accessed by the computer 1800.

By way of example, and not limitation, computer-storage media may include volatile and non-volatile, removable and non-removable media implemented in any method or technology for storage of information such as computer-readable instructions, data structures, program modules or other data. For example, computer-storage media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the computer 1800.

According to various embodiments, the computer 1800 may operate in a networked environment using logical connections to remote computers through a network such as the network 1822. The computer 1800 may connect to the network 1822 through a network interface unit 1806 connected to the bus 1804. It should be appreciated that the network interface unit 1806 may also be utilized to connect to other types of networks and remote computer systems. The computer 1800 may also include an input/output controller 1812 for receiving and processing input from a number of other devices, including a keyboard, mouse, or electronic stylus (not shown in FIG. 18). Similarly, an input/output controller may provide output to a display screen, a printer, or other type of output device (also not shown in FIG. 18).

As mentioned briefly above, a number of program modules and data files may be stored in the mass storage device 1810 and RAM 1814 of the computer 1800, including an operating system 1818 suitable for controlling the operation of a networked desktop, laptop, or server computer. The mass storage device 1810 and RAM 1814 may also store one or more program modules. In particular, the mass storage device 1810 and the RAM 1814 may store the motor controller reconfiguration application 1820 that is operative to perform the operations described above. The mass storage device 1810 and the RAM 1814 may also store other types of program modules.

Based on the foregoing, it should be appreciated that technologies for reconfiguring a power switching network 202 to redirect power from any number of parallel motor controllers 204 to one or more motors 108 as the present power load requirements 304 of the motors 108 change are provided herein. Utilizing the embodiments described herein, the number of parallel motor controllers 204 that service a group of motors 108 within an aircraft, vehicle, or other platform may increase or remain the same as with conventional systems. However, because the dynamic reconfiguration of the electrical connections within the power switching network 202 connecting the parallel motor controllers 204 to the motors 108 as described herein allows for power output capability of the parallel motor controllers 204 to be reduced, the overall weight of a motor controller system may be reduced.

From the foregoing, it will be appreciated that specific embodiments of the invention have been described herein for purposes of illustration on an aircraft, but that various modifications may be made without deviating from the invention. For example, the motor controllers may have more or fewer than the number of fixed modes described in certain embodiments above. The modes may correspond to different flight regimes than those discussed above. Certain embodiments were described in the context of particular systems (e.g., hydraulic pump motors, ECS systems, and nitrogen generation systems), but may be applied to other systems and/or combinations of systems in other embodiments. Aspects of the invention described in the context of particular embodiments may be combined or eliminated in other embodiments. For example, aspects of the backup motor controller functions may be provided in combination with motor controllers operating with a fixed number of predetermined modes. Further, while advantages associated with certain embodiments of the invention have been described in the context of those embodiments, other embodiments may also exhibit such advantages, and not all embodiments need necessarily exhibit such advantages to fall within the scope of the invention. Accordingly, the invention is not limited except as by the appended claims.

What is claimed is:

1. A method for real time power control over a plurality of motor controllers by at least one processor on a computer system, the method comprising:
    determining a first power load demand from a first plurality of active motors, wherein the first plurality of active motors is a subset of a plurality of motors;
    selecting a first combination of motor controllers of the plurality of motor controllers necessary to provide sufficient power to meet the first power load demand based at least in part on a maximum power output of the plurality of motor controllers;
    assigning a first set of system-wide priorities based at least in part on the maximum power output and the first power load demand;
    configuring a power switching network such that the first plurality of active motors are electrically connected to the first combination of motor controllers in accordance with the first set of system-wide priorities;
    receiving from a first control unit a power request for a first motor, wherein the power request is associated with a first priority level;
    determining a first priority designation for the first priority level in relation to the first set of system-wide priorities;
    assigning a second set of system-wide priorities based at least in part on the first priority designation and the first set of system-wide priorities;
    determining a second power load demand from a second plurality of active motors, wherein the second plurality of active motors comprises the first plurality of active motors and the first motor;
    selecting a second combination of motor controllers of the plurality of motor controllers necessary to provide sufficient power to meet the second power load demand; and
    configuring the power switching network such that the second plurality of active motors are electrically connected to the second combination of motor controllers in accordance with the second set of system-wide priorities.

2. The method of claim 1, further comprising:
    receiving a first signal from a second control unit, wherein the first signal is associated with the power request; and
    adjusting the first priority designation based on the first signal and thereby adjusting the second set of system-wide priorities.

3. The method of claim 2, further comprising:
    determining that the second power load demand is greater than the maximum power output of the plurality of motor controllers; and
    disconnecting a subset of lower priority active motors.

4. The method of claim 2, further comprising:
    determining that the second power load demand is greater than the maximum power output of the plurality of motor controllers; and
    configuring the power switching network such that the second combination of motor controllers deliver an amount of power to a subset of lower priority active motors that is reduced below an optimal operating amount of power for the subset of lower priority active motors in accordance with the second set of system-wide priorities.

5. The method of claim 4, further comprising:
    identifying that the power request is no longer valid;
    re-assigning the first set of system-wide priorities; and
    configuring the power switching network such that the amount of power delivered to a subset of lower priority active motors is increased back to the optimal operating amount of power for the subset of lower priority active motors in accordance with the first set of system-wide priorities.

6. The method of claim 2, further comprising:
    determining that the maximum power output of the plurality of motor controllers has been reduced to a lower maximum power output; and
    disconnecting a subset of lower priority active motors.

7. The method of claim 2, further comprising:
    determining that the maximum power output of the plurality of motor controllers has been reduced to a lower maximum power output; and
    configuring the power switching network such that an amount of power delivered to a subset of lower priority active motors is reduced below an optimal operating level for the subset of lower priority active motors in accordance with the second set of system-wide priorities.

8. The method of claim 1, wherein said first control unit is a bus power control unit.

9. The method of claim 1, wherein said each one of said plurality of motors may be selected from the group comprising a main engine electric start, a starter, a generator, an electronic engine controller, an auxiliary power unit controller, an auxiliary engine electric start, an auxiliary starter generator, a battery auxiliary engine electric start control unit, an electric taxi motor, a cabin air compressor, a hydraulic pump, a nitrogen generation motor, an environmental control system fan, and a cargo chilling motor.

10. The method of claim 2, wherein said second control unit is selected from the group comprising a generator control unit, an electronic engine controller, an auxiliary power unit controller, an auxiliary generator control unit, a battery voltage boost unit controller, an electric taxi controller, an electric brake controller, an air conditioning pack control unit, a hydraulic pump controller, a nitrogen generation system controller, an environmental control system fan controller, and a cargo chilling system controller.

11. A motor control system, comprising:
    a plurality of motors;
    a plurality of motor controllers configured for parallel electrical connection;
    a power switching network electrically connecting the plurality of motors to the plurality of motor controllers; and
    a parallel modular converter for dynamically controlling the power switching network, comprising a computer with at least one processor and a non-transitory storage medium having computer executable instructions stored thereon which, when executed on the computer, cause the computer to:
        determine a first power load demand from a first plurality of active motors, wherein the first plurality of active motors is a subset of the plurality of motors;
        select a first combination of motor controllers of the plurality of motor controllers necessary to provide sufficient power to meet the first power load demand based at least in part on a maximum power output of the plurality of motor controllers;

assign a first set of system-wide priorities based at least in part on the maximum power output and the first power load demand;

configure the power switching network such that the first plurality of active motors are electrically connected to the first combination of motor controllers in accordance with the first set of system-wide priorities;

receive from a first control unit a power request for a first motor, wherein the power request is associated with a first priority level;

determine a first priority designation for the first priority level in relation to the first set of system-wide priorities;

assign a second set of system-wide priorities based at least in part on the first priority designation and the first set of system-wide priorities;

determine a second power load demand from a second plurality of active motors, wherein the second plurality of active motors comprises the first plurality of active motors and the first motor;

select a second combination of motor controllers of the plurality of motor controllers necessary to provide sufficient power to meet the second power load demand; and configure the power switching network such that the second plurality of active motors are electrically connected to the second combination of motor controllers in accordance with the second set of system-wide priorities.

12. The system of claim 11, wherein said computer executable instructions stored thereon further cause the computer to:
receive a first signal from a second control unit, wherein the first signal is associated with the power request; and
adjust the first priority designation based on the first signal and thereby adjusting the second set of system-wide priorities.

13. The system of claim 12, wherein said computer executable instructions stored thereon further cause the computer to:
determine that the second power load demand is greater than the maximum power output of the plurality of motor controllers; and
disconnect a subset of lower priority active motors.

14. The system of claim 12, wherein said computer executable instructions stored thereon further cause the computer to:
determine that the second power load demand is greater than the maximum power output of the plurality of motor controllers; and
configure the power switching network such that the second combination of motor controllers deliver an amount of power to a subset of lower priority active motors that is reduced below an optimal operating amount of power for the subset of lower priority active motors in accordance with the second set of system-wide priorities.

15. The system of claim 14, wherein said computer executable instructions stored thereon further cause the computer to:
identify that the power request is no longer valid;
re-assign the first set of system-wide priorities; and
configure the power switching network such that the amount of power delivered to a subset of lower priority active motors is increased back to the optimal operating amount of power for the subset of lower priority active motors in accordance with the first set of system-wide priorities.

16. The system of claim 12, wherein said computer executable instructions stored thereon further cause the computer to:
determine that the maximum power output of the plurality of motor controllers has been reduced to a lower maximum power output; and
disconnect a subset of lower priority active motors.

17. The system of claim 12, wherein said computer executable instructions stored thereon further cause the computer to:
determine that the maximum power output of the plurality of motor controllers has been reduced to a lower maximum power output; and
configure the power switching network such that an amount of power delivered to a subset of lower priority active motors is reduced below an optimal operating level for the subset of lower priority active motors in accordance with the second set of system-wide priorities.

18. The system of claim 11, wherein said each one of said plurality of motors may be selected from the group comprising a main engine electric start, a starter, a generator, an electronic engine controller, an auxiliary power unit controller, an auxiliary engine electric start, an auxiliary starter generator, a battery auxiliary engine electric start control unit, an electric taxi motor, a cabin air compressor, a hydraulic pump, a nitrogen generation motor, an environmental control system fan, and a cargo chilling motor.

19. The system of claim 12, wherein said second control unit is selected from the group comprising a generator control unit, an electronic engine controller, an auxiliary power unit controller, an auxiliary generator control unit, a battery voltage boost unit controller, an electric taxi controller, an electric brake controller, an air conditioning pack control unit, a hydraulic pump controller, a nitrogen generation system controller, an environmental control system fan controller, and a cargo chilling system controller.

20. An aircraft having a motor control system, the motor control system comprising:
a plurality of motors;
a plurality of motor controllers configured for parallel electrical connection;
a power switching network electrically connecting the plurality of motors to the plurality of motor controllers; and
a parallel modular converter for dynamically controlling the power switching network, comprising a computer with at least one processor and a non-transitory storage medium having computer executable instructions stored thereon which, when executed on the computer, cause the computer to:
receive a communication including a requested mode and a requested mode power amount;
calculate a maximum power capacity based at least in part on a total number of motor controllers and a power amount associated with each motor controller;
calculate a current power usage based at least in part on what modes are currently running and what power is getting consumed as a result of those running modes;
determine a current power capacity that is currently available for use by taking the difference between the maximum power capacity and the current power usage;
run the requested mode and reduce the current power capacity to account for the running of the requested mode, only if the current power capacity is not less than the requested mode power amount, but if the current power capacity is less than the requested mode power amount, then determine a requested mode priority designation relative to all other running modes;

run the requested mode at only the current power capacity and then reduce the current power capacity to account for the running of the requested mode, only if the priority of the requested mode is less than or equal to the priority of all other running modes, but if the priority of the requested mode is not less than or equal to the priority of all other currently running modes, then determine if there exist any lower priority modes having a priority designation only lower than the requested mode priority designation, and if there exist any lower priority modes, then;

determine if the only lower priority modes that exist are first least priority modes having a priority designation only a single level lower than the requested mode priority designation, and if there exist any first least priority modes, then;

determine a first least priority modes total power that is currently used by those first least priority modes, then partially reduce the first least priority modes total power, direct that partially reduced power to the requested mode, and set the current power capacity to zero, only if it is possible to make a partial reduction of the first least priority modes total power, if it is not possible to make a partial reduction of the first least priority modes total power, then;

completely reduce the first least priority modes total power, direct that completely reduced power to the requested mode, and set the current power capacity to zero;

determine if there exist second least priority modes having a priority designation between the first least priority modes designation level and the requested mode priority designation level, and if there exist any second least priority modes, then partially reduce the first least priority modes total power, direct that partially reduced power to the requested mode, only if it is possible to make a partial reduction of the first least priority modes total power, if it is not possible to make a partial reduction of the first least priority modes total power, then completely reduce the first least priority modes total power;

determine a second least priority modes total power that is currently used by those second least priority modes;

partially reduce the second least priority modes total power, direct that partially reduced power to the requested mode, only if it is possible to make a partial reduction of the second least priority modes total power, if it is not possible to make a partial reduction of the second least priority modes total power, then;

completely reduce the first least priority modes total power and the second least priority modes total power, direct that combined completely reduced power to the requested mode, and set the current power capacity to zero.

\* \* \* \* \*